United States Patent [19]

Shiratori et al.

[11] Patent Number: 5,173,341
[45] Date of Patent: Dec. 22, 1992

[54] RUBBER-REINFORCING STEEL WIRES AND METHOD OF MANUFACTURING THE SAME

[75] Inventors: Nobuyoshi Shiratori; Masaki Katayama, both of Chiyoda, Japan

[73] Assignee: Tokyo Rope Mfg. Co., Ltd., Tokyo, Japan

[21] Appl. No.: 563,259

[22] Filed: Aug. 6, 1990

[30] Foreign Application Priority Data

Feb. 10, 1989 [JP] Japan .................................. 1-31353
Feb. 10, 1989 [JP] Japan .................................. 1-31354

[51] Int. Cl.$^5$ .............................................. B05D 1/18
[52] U.S. Cl. ........................... 427/434.6; 427/434.7; 428/379
[58] Field of Search ................... 427/434.6, 434.7; 428/379

[56] References Cited

U.S. PATENT DOCUMENTS

| | | | |
|---|---|---|---|
| 4,192,694 | 3/1980 | Rye | 427/434.6 X |
| 4,883,722 | 11/1989 | Coppens et al. | 428/625 |
| 4,937,098 | 6/1990 | Nishikawa et al. | 427/127 X |
| 5,041,329 | 8/1991 | Tojo et al. | 427/244 X |

FOREIGN PATENT DOCUMENTS

| | | |
|---|---|---|
| 0257667 | 3/1988 | European Pat. Off. |
| 58-87034 | 5/1983 | Japan |
| 60-41084 | 9/1985 | Japan |

OTHER PUBLICATIONS

Kunio Mori, "Functionalization of Metal Surfaces by Triazine Thiols, Practice of Surface Treatment", vol. 35, No. 5, pp. 210-218 (1988).
Chemical Abstracts, vol. 91, 1979, p. 72.
Chemical Abstracts, vol. 95, 1981, p. 60.
Database WPIL, Accession No. 86-142003 [22], Derwent Publications Ltd., London, JP-A-61-078 837 (Sankyo Kasei KK).

Primary Examiner—Michael Lusignan
Attorney, Agent, or Firm—Frishauf, Holtz, Goodman & Woodward

[57] ABSTRACT

Disclosed herein is a rubber-reinforcing steel wire which comprises: a steel wire; and a coating formed on the surface of said wire and containing a polymer of a triazine-thiol derivative represented by the following general formula:

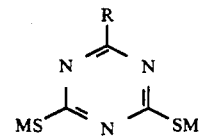

where R is $-OR'$, $-SR'$, $-NHR'$, or $-N(R')_2$; R' is H, alkyl group, alkenyl group, phenyl group, phenylalkyl group, alkylphenyl group, or a cycloalkyl group, and M is H, Na, Li, K, $\frac{1}{2}$Mg, $\frac{1}{2}$Ba, $\frac{1}{2}$Ca, primary, secondary or tertiary aliphatic amine, quaternary ammonium salt, or phosphonium salt.

20 Claims, 5 Drawing Sheets

RUBBER-REINFORCING STEEL WIRES AND METHOD OF MANUFACTURING THE SAME

BACKGROUND OF THE INVENTION

1. Field of the Invention

The present invention relates to steel wires for reinforcing rubber, and also to a method of manufacturing the same.

2. Description of the Related Art

Steel radial tires, steel-wire reinforced conveyer belts, steel-wire reinforced timing belts, steel-wire reinforced hoses, steel-wire reinforced handrails, and the like each comprise a rubber member and steel wires or steel cords (made by twisting the steel wires) embedded in the rubber member. The surfaces of the steel wires must be kept clean before they are embedded in the rubber member, otherwise they will greatly impair the corrosion resistance of the wires and the wire-rubber adhesion strength.

To have their surfaces kept clean, the wires are sealed within polyethylene bags, along with dehydrator and nitrogen gas, before they are delivered to the manufacturers of steel radial tires and other steel-wire reinforced products. It is relatively expensive to package the steel wires in this way. Further, the steel wires, thus packaged, can rarely remain sufficiently clean up until the time they are embedded in the rubber members. Consequently, the rubber products reinforced with these steel wires, such as steel radial tires, fail to have adequate wire-rubber adhesion strength, heat resistance, oil resistance, or water resistance.

As is known in the art, once it is surface-treated with triazine-thiol derivatives, a metal member has good corrosion resistance and can adhere firmly to rubber. Various methods of treating the surfaces of wires with triazine-thiol derivatives are disclosed in, for example, Kunio Mori, Functionalization of Metal Surfaces by Triazine Thiols, *Practice of Surface Treatment*, Vol. 35, No. 5, pages 210-218 (1988) (1989), Published Examined Japanese Patent Application No. 60-41084, and Published Unexamined Japanese Patent Application No. 58-87034. In these methods, the wires are immersed in a solution prepared by dissolving a triazine-thiol derivative in either water or an organic solvent, thereby adsorbing the triazine-thiol derivative on the surface of each wire.

With the conventional surface-treating methods described above, however, it is necessary to immerse the wires in the solution at a relatively high temperature for a long period of time. Further, the layer of triazine-thiol derivative formed on the surface of each wire is not sufficiently dense. Hence, the rubber products reinforced by the wires, thus treated, cannot be said to be adequately resistant to heat, water, steam, or fatigue. All the conventional methods are batch processes, and not suitable for mass-producing steel wires for reinforcing rubber products.

SUMMARY OF THE INVENTION

The object of the present invention is to provide steel wires which are sufficiently resistant to corrosion and can firmly adhere to rubber, and also a method of manufacturing such steel wires at high speed in large quantities.

According to an aspect of the invention, there are provided rubber-reinforcing steel wires each comprising a steel wire and a coating formed on the surface of the wire and containing a triazine-thiol derivative polymer.

According to a second aspect of this invention, there is provided a method of manufacturing a rubber-reinforcing steel wire, in which a steel wire is drawn through a die in a bath of a lubricant containing a triazine-thiol derivative.

According to a third aspect of the present invention, there is provided a method of manufacturing a rubber-reinforcing steel wire, in which a steel wire and an electrode are immersed in a solution of a triazine-thiol derivative, and a voltage is applied between the steel wire and the electrode.

The triazine-thiol derivative used in the present invention is one represented by the following general formula:

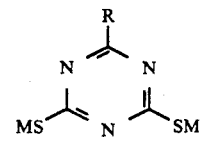

where R is $-OR'$, $-SR'$, $-NHR'$, or $-N(R')_2$; $R'$ is H, alkyl group, alkenyl group, phenyl group, phenylalkyl group, alkylphenyl group, or a cycloalkyl group, and M is H, Na, Li, K, $\frac{1}{2}Mg$, $\frac{1}{2}Ba$, $\frac{1}{2}Ca$, primary, secondary or tertiary aliphatic amine, quaternary ammonium salt, or phosphonium salt.

The rubber-reinforcing steel wires according to the present invention can firmly adhere to rubber. Hence, the composite members, each comprising a rubber member and the steel wires of the invention, are sufficiently resistant to heat, water, steam, and fatigue.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
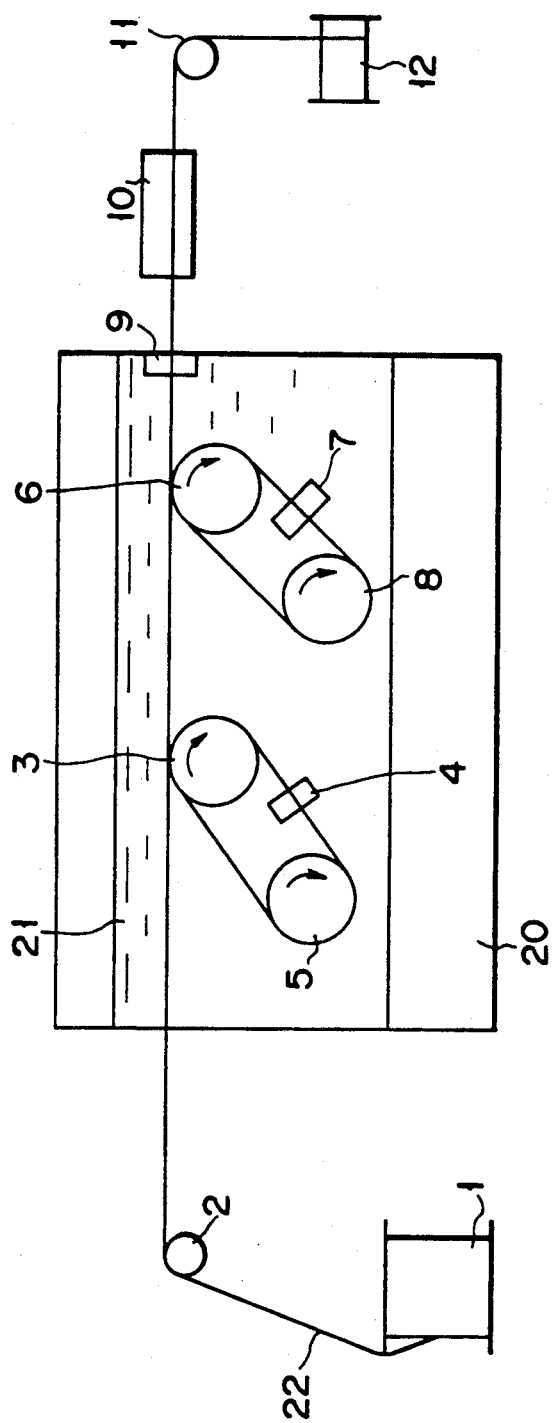
FIG. 1 is a diagram schematically showing the wire-drawing machine used for manufacturing several examples of steel wires according to the invention.

The steel wires used as starting materials in the present invention are: bare steel wires, copper-plated steel wires, bronze-plated steel wires, nickel-plated steel wires, tin-plated steel wires, zinc-plated steel wires, copper-tin plated steel wires, cobalt-plated steel wires, and the like.

Among the triazine-thiol derivatives, which are used in the present invention, are:

1,3,5-triazine-2,4,6-trithiol (F),
1,3,5-triazine-2,4,6-trithiol monosodium (FN),
1,3,5-triazine-2,4,6-trithiol monopotassium,
1,3,5-triazine-2,4,6-trithiol monoethanolamine (FME),
1,3,5-triazine-2,4,6-trithiol diethanolamine (FDE),
1,3,5-triazine-2,4,6-trithiol triethylamine (F.TEA),
1,3,5-triazine-2,4,6-trithiol octylamine,
1.3.5-triazine-2,4,6-trithiol tetrabutylammonium,
1,3,5-triazine-2,4,6-trithiol bis(tetrabutylammonium) (F2A),
6-anilino-1,3,5-triazine-2,4-dithiol (AF),
6-anilino-1,3,5-triazine-2,4-dithiol monosodium (AN),
6-anilino-1,3,5-triazine-2,4-dithiol triethylamine,
6-dibutylamino-1,3,5-triazine-2,4-dithiol (DB),
6-dibutylamino-1,3,5-triazine-2,4-dithiol monosodium (DBMN),
6-dibutylamino-1,3,5-triazine-2,4-dithiol monoethanolamine (DBME),
6-dibutylamino-1,3,5-triazine-2,4-dithiol ethylamine,
6-dibutylamino-1,3,5-triazine-2,4-dithiol triethylamine,
6-dibutylamino-1,3,5-triazine-2,4-dithiol butylamine (DBB),
6-dibutylamino-1,3,5-triazine-2,4-dithiol tetrabutylammonium (DBA),
6-dibutylamino-1,3,5-triazine-2,4-dithiol tetrabutylphosphonium,
6-diallylamino-1,3,5-triazine-2,4-dithiol,
6-diallylamino-1,3,5-triazine-2,4-dithiol monosodium (DAN),
6-diallylamino-1,3,5-triazine-2,4-dithiol monoethanolamine (DAME),
6-diallylamino-1,3,5-triazine-2,4-dithiol butylamine,
6-diallylamino-1,3,5-triazine-2,4-dithiol ethylenediamine,
6-diallylamino-1,3,5-triazine-2,4-dithiol ethylenetriamine,
6-octylamino-1,3,5-triazine-2,4-dithiol,
6-octylamino-1,3,5-triazine-2,4-dithiol monosodium.

These triazine-thiol derivatives are used either singly or in combination.

The steel wires according to the invention are coated with a layer containing a polymer of any one of triazine-thiol derivatives specified above. Of the triazine-thiol derivatives listed above, F and DAN help to improve the adhesion strength of the wires to rubber, and DB serves to enhance the corrosion resistance of the wire. Hence, these triazine-thiol derivatives and the aforementioned other derivatives can be used in various combinations.

It will now be explained a method of manufacturing the steel wires according to this invention.

First, a method of drawing a steel wire in a bath of lubricant containing a triazine-thiol derivative will be described.

The steel wires, which are to be drawn, are not limited to a specific type. When the wires are electroplated ones, it would be desired that the plated layer be 100 to 10,000 Å thick, more preferably 1,500 to 4,000 Å thick, and amount to 0.1 to 40 g/kg, more preferably 0.5 to 10 g/kg in terms of the weight ratio of the plated metal to the steel.

The lubricant used in this method is a so-called "emulsion type," which is an emulsion comprising a triazine-thiol derivative, an extreme pressure lubricant, an oiliness improver, an emulsifier, a defoaming agent, and the like—all dispersed in a solvent. The solvent is, for example, neutral or alkaline water, glycol (e.g., ethylene glycol derivatives), polyethylene glycol, or diglyme. The lubricant may further contain a rust preventive, and an antiseptic-mildewproof agent. The lubricant may be applied, either not diluted, or diluted 20 times or less, preferably diluted 5 to 10 times.

The content of the triazine-thiol derivative in the lubricant (not diluted) usually ranges from 0.001 to 20% by weight, preferably 0.01 to 5% by weight.

The extreme pressure lubricant prevents the wires from being sticked while they are being drawn in the lubricant. The extreme pressure lubricant is either one of the following substances or a combination there of:

ethylenediamine phosphate,
ethylenetriamine phosphate,
pentaethylenetetramine phosphate,
propylenediamine phosphate,
butylenediamine phosphate,
butylamine phosphate,
octylamine phosphate,
oleylamine phosphate,
fatty acid ester-ethyleneoxide adduct,
methylphosphate-propyleneoxide adduct,
butylphosphate-propyleneoxide adduct,
otlylphosphate-propyleneoxide adduct,
oleylephosphate-propyleneoxide adduct.

The content of the extreme pressure lubricant in the lubricant (not diluted) ranges from 0.1 to 15% by weight, preferably 1 to 10% by weight.

The oiliness improver is used not only to prevent the steel wires from being sticked while they are being drawn, but also to increase the wettability of the wires to the lubricant. The oiliness improver is usually amine salt of fatty acid such as:

octylamine acetate,
ethanolamine stearate,
diethanolamine stearate,
diethanolamine octanoate,
diethanolamine linoleate,
diethanolamine oleate,
butylamine oleate.

Alternatively, the oiliness improver can be a proof of reaction between fatty acid and epoxide, such as:

tetraethylene glycol oleate,
pentaethylene glycol octanoate,
nonaethyleneglycol stearate,
decaethylene glycol erucate,
decaethylene glycol linoleate.

Further, the oiliness improver can be a product of reaction between fatty acid ester and epoxide, such as:

butanedioloctanoate tetraethylene glycol,
butanediololeate hexaethylene glycol,
butanediolstearate pentaethylene glycol,
butanediolcaproate pentaethylene glycol,
hexanediolcaproate pentaethylene glycol.

The oiliness improvers specified above are used, either singly or in combination. The content of the oiliness improver in the lubricant (not diluted) ranges from 0.1 to 20% by weight, preferably 1 to 15% by weight.

The emulsifier emulsifies the extreme pressure lubricant, the oiliness improver, the defoaming agent, and the like. The emulsifier is usually a product of reaction between alkyl amine and an epoxy compound, such as:

octylamine tetraethylene glycol,
dodecylamine decaethylene glycol,
oleylamine decaethylene glycol,
stearylamine octaethylene glycol.

The content of the emulsifier in the lubricant (not diluted) is 0.1 to 10% by weight, preferably 0.5 to 5% by weight.

The defoaming agent suppresses the foaming of the emulsion. It is, for example, mineral spirit such as decane, octane, hexadecane, heptadecane, nonadecane. The content of the defoaming agent in the lubricant (not diluted) ranges from 0.1 to 10% by weight, preferably 0.5 to 5% by weight.

The rust preventive is used to prevent the corrosion of the iron or bronze components in the steel wires. It is one selected from the following group:

methyl p-hydroxylbenzoate,
bisphenol A,
benzotriazole,
methylbenzotriazole.

The content of the rust preventive in the lubricant (not diluted) is 0.01 to 5% by weight, preferably 0.1 to 1% by weight. The rust preventive need not be used, since the triazine-thiol derivative used also prevents the corrosion of the iron or bronze components in the steel wires.

The antiseptic-mildewproof agent prevents the lubricant from being contaminated by microorganisms. It is one selected from the following group:

1,2-benzisothiazol-3-on,
chlorinated phenol,
formaldehyde,
formaldehyde-emitting agent.

The content of the antiseptic-mildewproof agent in the lubricant (not diluted) ranges from 0.01 to 5% by weight, preferably 0.1 to 1% by weight. This agent need not be used, since the triazine-thiol derivative used can also prevent the lubricant from being contaminated by microorganisms.

In this invention, the steel wires are drawn in the lubricant by means of a wet-type wire-drawing machine. More specifically, the die of the machine is placed in a tank filled with the lubricant, and a steel wire having a diameter of, for example, 0.1 to 10 mm, preferably 1 to 4 mm, is passed through the die at a speed of 1 to 200 m/min and thereby elongated such that its diameter reduces to 0.1 to 1 mm. When the wire is not plated one or a nickel-plated one which is relatively hard, it is passed through the die at a low speed and elongated to a low degree. By contrast, when the wire is a copper-plated one or a bronze-plated one which is relatively soft, it is passed through the die at a high speed and elongated to a high degree. In other words, an optimal value for the speed of passing the wire through the die, and an optimal value for the degree of wire-elongation are determined by the type of the steel wire.

As the steel wire is drawn through the die in the bath of the lubricant, it is coated with a layer containing a polymer of the triazine-thiol derivative. It can be ascertained, by means of gel permeation chromatography, that the layer thus coated on the wire contains the polymer. Also can it be ascertained, by means of infrared spectroscopy, that the layer contains disulfide group, thiol group, unsaturated group, or the like.

It can be assumed that the layer is coated on the steel wire by virtue of the following mechanism. When the wire contacts the lubricant, the triazine-thiol derivative is adsorbed into the surface of the steel wire, probably in the same way as in the conventional surface-treating methods. As the wire is then passed through the die and elongated, the triazine-thiol derivative adsorbed on the wire is put under a high pressure at a high temperature, though for an extremely short period of time. The surface temperature of a bronze-plated steel wire, for example, is said to rise to several hundred degrees centigrade as the wire is drawn under 100 kgf/mm$^2$. As a result, a layer containing a polymer of the triazine-thiol derivative is formed on the surface of the steel wire.

The layer, thus formed on the steel wire, is not only dense, but also strong, and therefore protects the wire from corrosion. In addition, since it contains disulfide group, it can react with some component of rubber. Hence, when the steel wire, thus drawn and surface-treated, is embedded in a rubber member, adheres firmly to the rubber.

It will now be explained a method of applying a voltage between the steel wire and the electrode, both immersed in a solution of a triazine-thiol derivative.

This method is applied to a steel wire having good electrical conductivity, such as a bronze-plated steel wire, preferably a wire plated with a bronze layer containing at least 60% by weight of copper. The steel wire can be either one not drawn yet or one already drawn. Further, it can be either one made of a single wire, or one made of two or more wires twisted together. In this method, the steel wire functions as anode for achieving the electrodeposition of the triazine-thiol derivative, and an electrode made of electro-chemically inactive material, such as platinum or carbon, is used as cathode for accomplishing the electrodeposition of the triazine-thiol derivative.

In this method, a solution is used in which triazine-thiol derivative is dissolved in water or an organic solvent. The organic solvent is one selected from the group consisting of methanol, ethanol, isopropanol, ethylene glycol derivative, N,N-dimethylformamide (DMF), dimethyl sulfoxide (DMSO), acetone, benzene, toluene, acetonitrile, propylene carbonate, ethylene carbonate, and the like. Of the triazine-thiol derivatives used in the invention, a metal salt or an amine salt is dissolved in water or alcohol, thus forming an aqueous solution or an alcohol solution, and a free-type derivative or an ammonium salt is dissolved in an appropriate solvent, thus forming a solution. The content of the triazine-thiol derivative in the solution ranges from 0.001 to 10% by weight, preferably 0.05 to 2% by weight. In the case where the solution has a low content of the triazine-thiol derivative or has insufficient electrical conductivity, a salt such as $NaClO_3$, $Na_2SO_4$, $Na_2HPO_3$, $Na_3BO_3$ or the like may be added to the solution. In use, the solution of triazine-thiol derivative is maintained at 0° to 80° C.

The voltage applied between the steel wire and the electrode opposing the wire is 100 V or less, preferably 0.1 to 20 V. When the voltage is applied between the wire and the electrode, a current flows between them. This current ranges from 1 mA to 10 A, depending on the electrical conductivity of the solution in which the wire and the electrode are immersed. Preferably, this current is 5 to 100 mA. By virtue of this current, the triazine-thiol derivative is adsorbed onto the surface of the steel wire, forming a compound layer thereon. It suffices to apply the voltage for 0.1 seconds to 10 minutes.

In order to treat a steel wire continuously by the method according to the present invention, use is made of an electrodeposition apparatus which comprises a tank filled with the solution of a triazine-thiol derivative, an electrode located in the tank, a power supply circuit for applying a voltage between the electrode and a steel wire immersed in the bath of the solution, and a wire-feeding mechanism having a supply stand (e.g., a wire take-up device, reels, etc.) for continuously feeding the wire through the bath of the solution. The electrodeposition apparatus may further comprises pretreatment device connected to the input side of the tank, and post-treatment devices connected to the output side of the tank. The pre-treatment devices is, for example, a wire-degreasing device, and the post-treatment devices are, for example, a wire-washing device and a wire-drying device. It is prefer able that the electrode be a hollow cylinder, in which case the steel wire is fed through the electrode.

As the electrodeposition proceeds, the triazine-thiol derivative undergoes the electro-chemical reaction induced by the voltage applied between the steel wire and the electrode, whereby a layer containing a polymer of the derivative is formed on the surface of the steel wire. This layer has substantially the same properties as the layer formed when the wire is treated by the wire drawing method above-mentioned.

The steel wires, thus surface-treated either by wire drawing or electrodeposition and now coated with a layer containing the polymer of the triazine-thiol derivative, is used by itself. Alternatively, the steel wires, thus surface-treated, are twisted together into a cord for practical use. The wires can be twisted together into a cord, without no troubles, by any method commonly used at present, such as those disclosed in Setsuo Fukuhara, *Fibers and Industry*, Vol. 40, No. 11, p. 627 (1984).

The steel wires or the steel cord are embedded in a member made of a rubber compound, thereby manufacturing various products such as steel radial tires, steel-wire reinforced conveyer belts, steel-wire reinforced timing belts, steel-wire reinforced hoses, and steel-wire reinforced handrails.

The composition of the rubber compound is not limited particularly. The rubber compound comprises rubber, a filler, a softener, a vulcanizer, a vulcanization accelerator, and a vulcanization co-accelerator. The rubber compound may further comprise a lubricant, a stabilizer, an adhesion improver (i.e., an adhesion accelerator).

The rubber is one selected from the group consisting of:

natural rubbers (NR),
isoprene rubber,
butadiene rubber (BR),
solution polymerized butadiene rubber,
solution polymerized styrene-butadiene rubber (SBR),
acrylonitrile-butadiene rubber (NBR),
ethylene-propylene rubber,
ethylene-propylene-diene-methylene rubber (EPDM),
silicone rubber,
butyl rubber,
chlorinated butyl rubber,
brominated butyl rubber,
chloroprene rubber,
fluorocarbon rubber,
hydrine rubber,
epichlorohydrine-ethylene oxide rubber,
epichlorohydrine-ethylene oxide-allyl glycidyl ether rubber,
epichlorohydrine-propylene oxide-allyl glycidyl ether rubber,
acrylic rubber and its copolymer (Cl-based, epoxy-based, or unsaturated one),
ethylene-vinylacetate-acrylate rubber,
urethane rubber.

The filler is used to increase the amount of the rubber compound or to reinforce the rubber compound. The filler is, for example, carbon black, rubber-rein forcing carbon black, white carbon, hard clay, calcium carbonate, silica, or the like. It is used in an amount of 5 to 200 parts by weight, preferably 30 to 100 parts by weight, to 100 parts by weight of the rubber.

The softener is added in order to improve the workability or moldability of the rubber compound. It is a phthalate-type plasticizer such as dioctyl phthalate (DOP) or dibutyl phthalate; a fatty acid ester-type plasticizer such as dioctyl adipate or dioctyl sebacate; a phosphate-type plasticizer such as triphenyl phosphate or tricresyl phosphate; chlorinated paraffin; process oil; or naphthene oil. The softener is used in an amount of 100 parts by weight or less, preferably 5 to 50 parts by weight, to 100 parts by weight of the rubber.

The vulcanizer is added to enhance the elasticity of the rubber. It is selected from the group consisting of sulfur, dicumyl peroxide, 1,1-bis(t-butylperoxy)-3,3,5-trimethylcyclohexane, α,α'-bis(t-butylperoxy) isopropyl benzene, 2,5-dimethyl-2,5-di(t-butylperoxy) hexane, 2,5-dimethyl-2,5-di(t-butylperoxy)hexyne-3, 1,3,5-triazine-2,4,6-trithiol, 6-butylamino-1,3,5-triazine-2,4-dithiol, ethylene triurea, hexamethylene diamine, ammonium benzoate, and bisphenol A. The amount of the vulcanizer is rather arbitrary, depending on the type of the rubber used. However, when sulfur is used as vulcanizer, it is used in an amount of 0.5 to 10 parts by weight, preferably 2 to 6 parts by weight, to 100 parts by weight of the rubber. If the amount of sulfur used is less than 0.5 parts by weight, the rubber will not be vulcanized sufficiently, and the rubber compound will not adhere firmly to the steel wires; if the amount of sulfur exceeds 10 parts of weight, the rubber compound will be much less resistant to heat than desired, and the resultant rubber-wire composite will be far less resistant to water than required.

The vulcanization accelerator and the vulcanization co-accelerator are added for the purpose of promoting the function of the vulcanizer. The vulcanization accelerator can be: a thiazole-type accelerator such as 2-mercaptobenzothiazole (M), 2-(4-morpholinyldithio) benzothiazole, or dibenzothiazyldisulfide (DM); a sulfenamide-type accelerator such as N-cyclohexyl-2-benzothiazylsulfenamide (CBS), N-oxydiethylen-2-benzothiazylsulfenamide, N,N-dicyclohexyl-2-benzothiazylsulfenamide, or N-t-butyl-2-benzothiazylsulfenamide; a thiuram-type accelerator such as tetramethylthiurammonosulfide, tetramethylthiuramdisulfide, or tetrabutylthiuramdisulfide; or polyfunctional monomer such as fatty acid amine salt, quarternary ammonium salt, organic phosphonium salt, triallyl isocyanurate, trimethylolpropane triacrylate, or diallyl phthalate. The vulcanization co-accelerator can be at least one selected from the group consisting of ZnO, MgO, BaO, and Ca(OH)$_2$.

The amount of the vulcanization accelerator and that of the vulcanization co-accelerator are arbitrary, depending on the type of the rubber used and also the type of the vulcanizer used. However, it is generally appropriate to add them in an amount of 0.1 to 20 parts by weight to 100 parts by weight of the rubber.

In order to manufacture wire-rubber composite products, it is advisable that the rubber compound contain those components specified above. The rubber compound need not contain such a lubricant, a stabilizer, an adhesion improver as will be mentioned below. However, if the compound contains these substances, the resultant wire-rubber composite product will be more resistant to water, heat, steam and fatigue than otherwise.

The lubricant may be added to improve the fluidity of the rubber compound, thereby to render it easier to manufacture wire-rubber composite products. It can be stearic acid, metal (Na, Mg, Ca, Ba, Zn) stearate, ethylene bisstearamide, ethylene biserucamide, paraffin wax, or the like. The lubricant is used in an amount of 0.1 to 5 parts by weight to 100 parts by weight of rubber.

The stabilizer may be added to prevent deterioration of the wire-rubber composite products. It can be phenylenediamine-type antioxidant, phenol-type antioxidant, nickel dithiocarbamate, benzophenone, or the like. The stabilizer is used in an amount of 0.1 to 5 parts by weight to 100 parts by weight of rubber.

The adhesion improver, which the rubber compound may contain, is, for example, 1,3,5-triazine-2,4,6-trithiol, 6-dibutylamino-1,3,5-triazine-2,4-dithiol, 6-diallylamino-1,3,5-triazine-2,4-dithiol, cobalt naphtenoate, cobalt stearate, metal (Co, Mn, Zn, Mo, Cr) aminobenzoate, resorcin, cresol, resorcin-formalin latex, resol-type phenolic resin (including uncured ones), formalin-alkylphenol resin, formalin-cresol resin (including uncured ones), monomethylol melamine, dimethylol melamine, trimethylol melamine, hexamethylol melamine, monoethoxymethylol melamine, tetramethoxymethylol melamine, pentamethoxymethylol melamine, monomethylol urea, trimethylol urea, trimethoxymethylol urea, ethylene maleimide, butylene maleimide, phenylene maleimide, metal (Co, Ni, Fe, Mn) abietate, or the like. The adhesion improver is used in an amount of 0.1 to 20 parts by weight, preferably 0.5 to 5 parts by weight, to 100 parts by weight of the rubber.

The steel wires thus surface-treated, or the cords made of these wires are embedded in a member made of the rubber compound specified above, thus forming a composite member. The composite member is heated by means of either hot-pressing or steam-heating, whereby the rubber is vulcanized, whilst the wires or cords adhere firmly to the the rubber member. This process is performed, usually at 80° to 230° C., preferably 130° to 180° C., for 5 to 10 minutes, preferably 10 to 60 minutes. The wire-rubber composite member is further subjected to aftercure, if necessary depending on the type of the rubber used or the vulcanizer used. As a result of this, a wire-rubber composite product is manufactured.

The present invention will now be described, with reference to several examples.

EXAMPLES 1 TO 5

First, the wet-type wire-drawing apparatus used in manufacturing Examples 1 to 5 of steel wires according to the present invention.

As is illustrated in FIG. 1, the wire-drawing apparatus has a lubricant tank 20 filled with lubricant 21. A steel wire 22 is fed from a supply bobbin 1, guided by a guide roller 2, and enters the lubricant tank 20. In the tank 20, the wire 22 is wound around a free roller 3 and a driving roll 5, passing through a die unit 4. Also in the lubricant tank 20, the wire 22 is further wound around a free roller 6 and a driving roller 8, passing a die unit 7. Then, the wire 22 is fed out of the tank 20 through a die 9. Outside the lubricant tank 20, the steel wire 22 is guided by a capstan 10 and a guide roller 11, and is finally taken up around a take-up bobbin 12.

Figure 2:
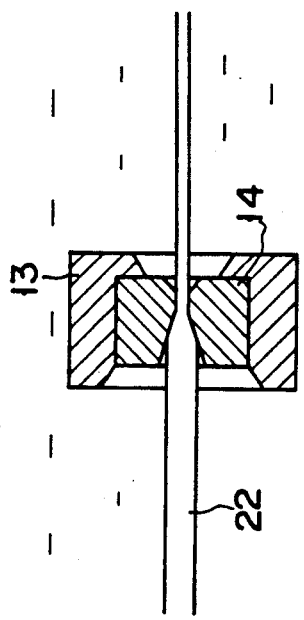
FIG. 2 is a sectional view of the die incorporated in the machine shown in FIG. 1.

The dies 4 and 7 are each a combination of several dies, mounted one upon another. As is shown in FIG. 2, each die constituting either die unit comprises a die case 13 and an extremely hard chip 14 fitted in the case 13.

EXAMPLE 1

Two emulsion-type lubricants were prepared. The first emulsion type lubricant comprised 4 parts by weight of ethylenediamine phosphate, 8 parts by weight of triethanolamine oleate, 4 parts by weight of laurylamine octanethyleneglycol, 3 parts by weight of octadecane, 2 parts by weight of tetraethylene glycol octate, 5 parts by weight of butanediol dodecylphosphate pentapropylene glycol, 0.5 parts by weight of methyl p-hydroxybenzoate, 1 part by weight of methylbenzotriazole, 0.5 parts by weight of 1,2-benzoisothiazol-3-on, 72.5 parts by weight of water, and 0.5 parts by weight of 1,3,5-triazine-2,4,6-trithiol (F). The second emulsion-type lubricant was different only in that 0.5 parts by weight of 6-dibutylamino-1,3-5-triazine-2,4-dithiol (DB) is used in place of 0.5 parts by weight of 1,3,5-triazine-2,4,6-trithiol (F).

These two emulsion-type lubricants thus prepared were diluted seven times. Each diluted lubricant was filled in the lubricant tank of the apparatus illustrated in FIG. 1. A bronze-plated wire (a plated amount: 4.1 g per 1 kg of steel, Cu content in the plate: 65%) was drawn in the bath of each lubricant at rate of 30 m/min. Thus two bronze-plated steel wires were formed, either having a diameter of 1.20 mm (hereinafter referred to as "Example 1-1" and "Example 1-2").

Each surface-treated wire was immersed in 1N hydrochloric acid solution so as to remove the coating from the wire. The solution was evaporated with a rotary evaporator, thus the coating material is obtained. The coating material was dissolved in THF, and was subjected to gel permeation chromatography. Also, the coating material was subjected to infrared-absorption spectrum analysis by KBr method.

Figure 3:
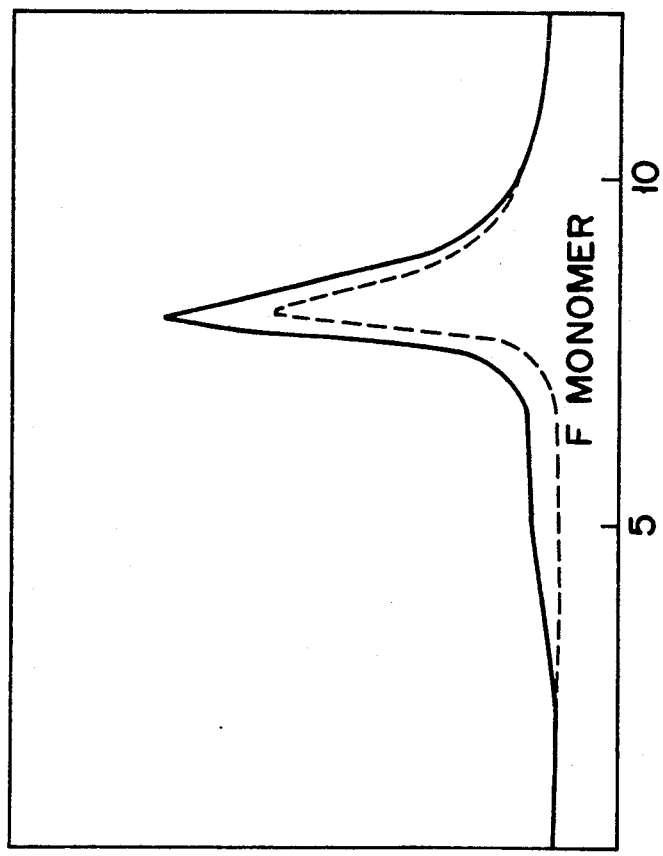
FIG. 3 is a gel permeation chromatograph of the coating formed on the steel wire which has been surface-treated with 1,3,5-triazine-2,4,6-trithiol.
Figure 4:
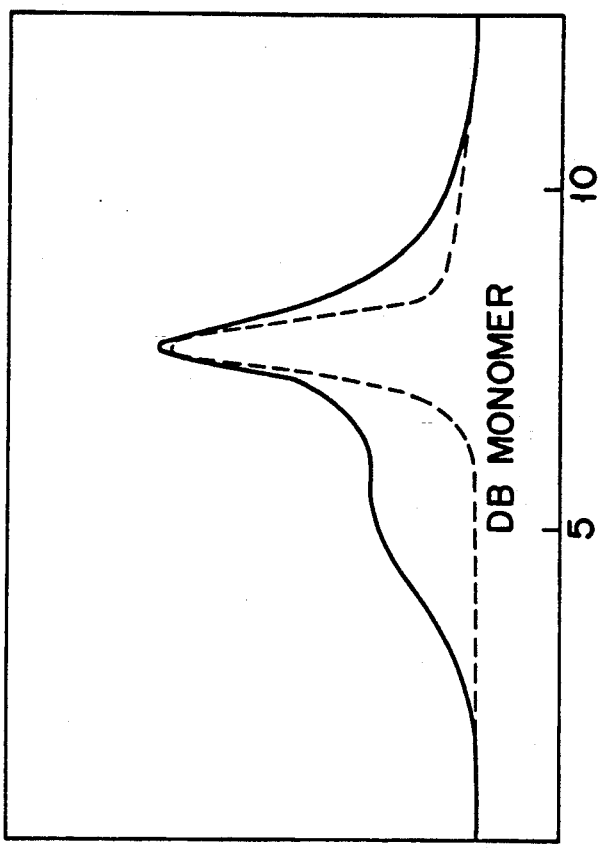
FIG. 4 is a gel permeation chromatograph of the coating formed on the steel wire which has been surface-treated with 6-dibutylamino-1,3,5-triazine-2,4-dithiol.

FIG. 3 is a gel permeation chromatograph of the coating of Example 1-1, also showing that of F monomer (broken-line curve). FIG. 4 is a gel permeation chromatograph of the coating of Example 1-2, also showing that of DB monomer (broken-line curve).

Figure 6:
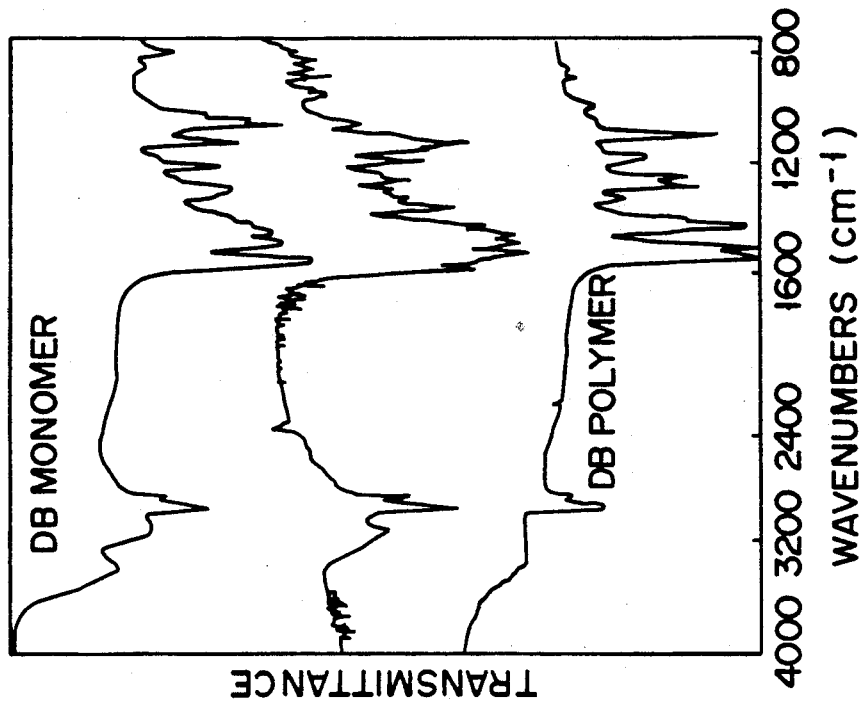
FIG. 6 is an infrared spectrum of the coating formed on the steel wire which has been surface-treated with 6-dibutylamino-1,3,5-triazine-2,4-dithiol.
Figure 5:
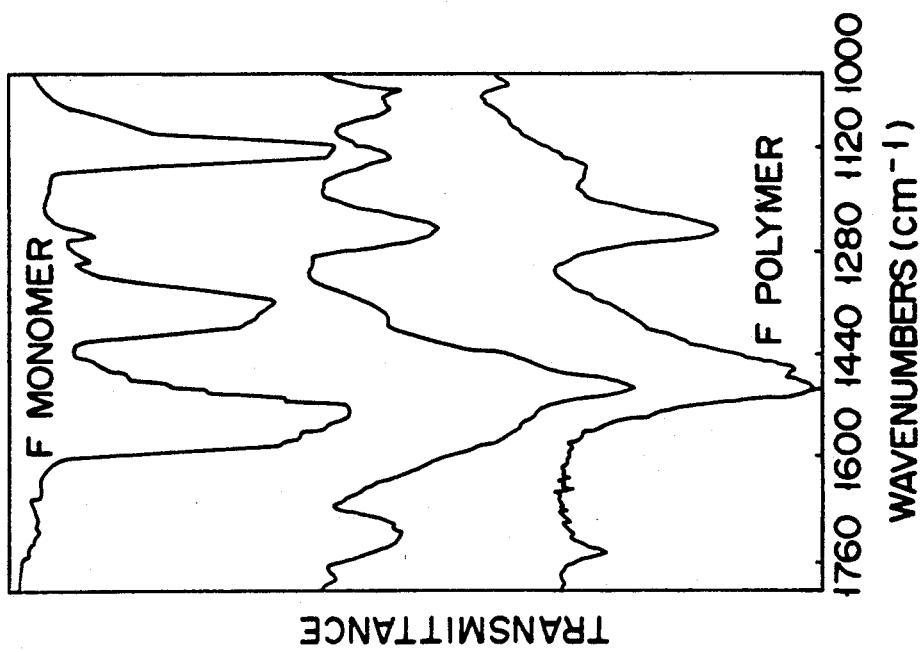
FIG. 5 is an infrared spectrum of the coating formed on the steel wire which has been surface-treated with 1,3,5-triazine-2,4,6-trithiol.

FIG. 5 is the infrared (IR) spectrum of the coating formed on Example 1-1, also showing those of F monomer and F polymer. FIG. 6 is the IR spectrum of the coating formed on Example 1-2, also showing those of DB monomer and DB polymer. Both the F polymer and the DB polymer had been synthesized by means of thermal polymerization.

As is evident from FIGS. 3 and 4, the gel-permeation chromatograph curves of both the coating of Example 1-1 and that of Example 1-2 have low peaks at retention time of about 5 minutes. Obviously, the coatings were compounds having molecular weights greater than that of F monomer.

As can be understood from FIG. 5, the IR spectrum of F monomer had a strong peak at wavelength of about 1360 cm$^{-1}$ and a weak peak at wavelength of about 1250 cm$^{-1}$. By contrast, the IR spectrum of F polymer had no peaks at wavelength of about 1360 cm$^{-1}$ and a strong peak at wavelength of about 1250 cm$^{-1}$. In view of FIG. 5, the coating of Example 1-1 had an IR spectrum similar to that of F polymer.

As is shown in FIG. 6, the IR spectra of DB monomer and DB polymer are different for wavelengths ranging from 1200 to 1600 cm$^{-1}$. The IR spectrum of the coating of Example 1-2 is similar to that of the DB polymer.

In view of FIGS. 2, 3, 4, and 5, the coatings of Examples 1-1 and 1-2 are considered to contain both polymer and monomer of a triazine-thiol derivative.

EXAMPLE 2

Five emulsion-type lubricants were prepared which were identical in that each comprised the following components, but different in that they contained the five different triazine-thiol derivatives specified in Table 1.

COMMON COMPONENTS OF THE FIVE EMULSIONS (1) 4 parts by weight of ethylenediamine phosphate
(2) 8 parts by weight of triethanolamine oleate
(3) 4 parts by weight of lauryl amine octaethyleneglycol
(4) 3 parts by weight of octadecane
(5) 2 parts by weight of tetraethylene glycol octate
(6) 5 parts by weight of butanediol dodecylphosphate pentapropylene glycol
(7) 0.5 parts by weight of methyl p-hydroxybensoate
(8) 1 part by weight of methylbenzotriazole
(9) 0.5 parts by weight of 1,2-benzoisothiazol-3-on
(10) 72.5 parts by weight of water Further, for purpose of comparison, an emulsion-type lubricant was prepared which was identical to the five emulsion-type lubricants specified above, except that it contained no triazine-thiol derivatives.

The six lubricants, thus prepared, were diluted seven times. Each diluted lubricant was filled in the lubricant tank of wire-drawing apparatus illustrated in FIG. 1. A bronze-plated wire (a plated amount: 4.1 g per 1 kg of steel, Cu content in the plate: 65%) was drawn in the bath of each lubricant at rate of 850 m/min, thereby obtaining a bronze-plated wire having a diameter of 0.30 mm. Two wires of each type is twisted together, into a steel cord. Hence, six steel cords were manufactured, one of which will be referred as "Comparative Example 2-1," and the remaining five of which will be referred to as "Examples 2-1 to 2-5."

In the meantime, an natural-rubber (NR) compound was prepared which comprised:

(a) 100 parts by weight of natural rubber (NR)
(b) 50 parts by weight of carbon black (HAF)
(c) 5 parts by weight of process oil
(d) 5 parts by weight of sulfur
(e) 0.8 parts by weight of N-cyclohexyl-2-benzothiazyl-sulfenamide (CBS)
(f) 10 parts by weight of zinc oxide
(g) 2 parts by weight of cobalt naphthenoate
(h) 1 part by weight of 6-ethoxy-2,2,4-trimethyl-1,2-dihydroquinoline
(i) 3 parts by weight of resorcin
(j) 4 parts by weight of hexamethylol melamine Each test piece of cord of Comparative Example 2-1 and Examples 2-1 to 2-5 was embedded its one end by 1.6 cm into mass of the NR compound thus prepared, and then the rubber mass was vulcanized at 140° C. for 30 minutes. Thereby six sets of cord-rubber composite members were formed, each set consisting of several members.

Each cord-rubber composite member of every set was subjected to pull-out test carried out by an automatic tensile tester. More specifically, the test piece of cord was pulled out of the rubber member at 20° C. at the rate of 50 mm/min, and the pull-out strength was measured. Also, the ratio of the cord surface area covered with the rubber was measured. The measurements were performed immediately after the composite had been formed (i.e. "initial"), and after the composite had been steam-deteriorated. The steam-deterioration was performed in a water-vapor atmosphere, at humidity of 100% and temperature of 120° C., for 10 to 25 hours as is specified in Table 1. The results of the pull-out test were as is represented in Table 1.

As can be understood from Table 1, although Examples 2-1 to 2-5 had an initial pull-out strength similar to that of Comparative Example 2-1, they had a pull-out strength far greater than that of Comparative Example 2-1 after they had been steam-deteriorated. In addition, as is also evident from Table 1, the wire-rubber adhesion in Examples 2-1 to 2-5 was stronger than that in Comparative Example 2-1.

TABLE 1

| | Triazine-Thiol Derivative* | Pull-out Strength (kgf) (Upper Row) RCA** (%) (Lower Row) | | | | |
|---|---|---|---|---|---|---|
| | | Initial | 10 Hr. | 15 Hr. | 20 Hr. | 25 Hr. |
| Comparative Example 2-1 | — | 45 | 38 | 21 | 15 | 10 |
| | | 95 | 80 | 40 | 15 | 0 |
| Example 2-1 | F | 45 | 42 | 40 | 35 | 25 |
| | | 95 | 90 | 75 | 60 | 40 |
| Example 2-2 | DB | 45 | 40 | 35 | 30 | 25 |
| | | 95 | 90 | 75 | 55 | 30 |
| Example 2-3 | FME | 45 | 41 | 39 | 33 | 28 |
| | | 95 | 90 | 75 | 60 | 35 |
| Example 2-4 | DBB | 45 | 42 | 38 | 34 | 26 |
| | | 95 | 90 | 75 | 60 | 40 |
| Example 2-5 | DAE | 45 | 42 | 40 | 34 | 25 |
| | | 95 | 90 | 75 | 60 | 40 |

F: 1,3,5-triazine-2,4,6-trithiol
DB: 6-dibutylamine-1,3,5-triazine-2,4-dithiol
FME: 1,3,5-triazine-2,4,6-trithiol.monoethanolamine
DBB: 6-dibutylamine-1,3,5-triazine-2,4-dithiol.butylamine
DAE: 6-diallylamino-1,3,5-triazine-2,4-dithiol.monothanolamine
*Note: "RCA" stands for "rubber-covered area."

EXAMPLE 3

Five emulsion-type lubricants were prepared which were identical in that each comprised the following components, but different in that they contained the 6-dibutylamino-1,3,5-triazine-2,4-trithiol monoethanol amine (DBME) in different amounts ranging from 0.15 to 3 g per 100 ml, as is specified in Table 2.

COMMON COMPONENTS OF THE FIVE EMULSIONS (1) 4 parts by weight of ethylenediamine phosphate
(2) 8 parts by weight of triethanolamine oleate
(3) 4 parts by weight of lauryl amine octaethyleneglycol
(4) 3 parts by weight of octadecane
(5) 2 parts by weight of tetraethylene glycol octate
(6) 5 parts by weight of butanediol dodecylphosphate pentapropylene glycol
(7) 0.5 parts by weight of methyl p-hydroxybencoate
(8) 1 part by weight of methylbenzotriazole
(9) 72.5 parts by weight of water Further, for purpose of comparison, an emulsion-type lubricant was prepared which was identical to the five emulsion-type lubricants specified above, except that it contained no DBME.

The six lubricants, thus prepared, were diluted seven times. Each diluted lubricant was filled in the lubricant tank of wire drawing apparatus illustrated in FIG. 1. A bare steel wire or a bronze-plated wire (plate thickness: 5800 Å, Cu content in the plate: 65%), each having a diameter of 1.68 mm, was drawn in the bath of each lubricant at rate of 0.5 to 100 m/min as is shown in Table 2. Thereby six bare steel wires and one bronze-plated wire were formed, each having a diameter of 1.50 mm. The former will be referred to as "Example 3-1 to 3-5" and "Comparative Example 3-1," and the latter will be referred to as "Comparative Example 3-2."

In the meantime, an natural-rubber (NR) compound was prepared which comprised:

(a) 100 parts by weight of natural rubber (NR)
(b) 50 parts by weight of carbon black (HAF)
(c) 5 parts by weight of process oil
(d) 4 parts by weight of sulfur
(e) 0.8 parts by weight of N-cyclohexyl-2-benzothiazyl-sulfenamide (CBS)
(f) 10 parts by weight of zinc oxide
(g) 1 part by weight of 6-ethoxy-2,2,4-trimethyl-1,2-dihydroquinoline
(h) 3 parts by weight of resorcin
(i) 4 parts by weigh Each test piece of wire of Examples 3-1 to 3-5 and Comparative Examples 3-1 and 3-2 was embedded its one end by 2.54 cm into mass of the NR compound thus prepared, and then the rubber mass was vulcanized at 153° C. for 30 minutes. Thereby seven sets of wire-rubber composite members were formed, each set consisting of several members.

Each wire-rubber composite member of every set was subjected to pull-out test carried out by the automatic tensile tester. More specifically, the test piece of wire was pulled out of the rubber member at 20° C. at the rate of 50 mm/min, and the pull-out strength was measured. Also, it was examined how much rubber remained on the surface of each wire pulled out of the rubber member. The measurements were performed immediately after the composite had been formed, and after the composite had been steam-deteriorated. The steam-deterioration was performed in a water-vapor atmosphere, at humidity of 100% and temperature of 120° C., for 10 to 25 hours as is specified in Table 2. The results of the pull-out test were as is represented in Table 2.

As is evident from Table 2, the bare steel wire of Comparative Example 3-1, which had been treated with the lubricant containing DBME and drawn at an extremely low speed was easily pulled out of the rubber member. Its pull-out strength was just as small as those of bare steel wires not surface-treated by wire-drawing at all. Though not shown in Table 2, almost no rubber compound remained on the surface of the wire of Comparative Example 3-1 which had been pulled out of the rubber member. This reveals that the pull-out strength of the wire of Comparative Example 3-1 resulted from the friction between the wire and the rubber member.

The bronze-plated wire of Comparative Example 3-2, which had been drawn in a bath of the lubricant containing no triazine-thiol derivatives exhibited a great initial pull-out strength, but an insufficient pull-out strength once they had been steam-deteriorated.

By contrast, the bare steel wires of Examples 3-1 to 3-5 had an initial pull-out strength far greater than that of Comparative Example 3-1. Moreover, even after they had been steam-deteriorated, they exhibited a pull-out strength much greater than those of Comparative Examples 3-1 and 3-2.

TABLE 2

|  | Concentration (g/100 ml) | Type of wire* | Drawing Speed (m/min) | Pull-out Strength (kgf) | | | | |
| --- | --- | --- | --- | --- | --- | --- | --- | --- |
|  |  |  |  | Initial | 10 Hr. | 15 Hr. | 20 Hr. | 25 Hr. |
| Comparative Example 3-1 | 0.2 | Bare | 0.5 | 40 | 35 | 30 | 30 | 30 |
| Comparative Example 3-2 | — | Bronze | 20 | 230 | 210 | 100 | 40 | 40 |
| Example 3-1 | 0.15 | Bare | 20 | 200 | 190 | 180 | 160 | 140 |
| Example 3-2 | 0.2 | Bare | 20 | 210 | 200 | 190 | 180 | 160 |
| Example 3-3 | 1.0 | Bare | 50 | 230 | 220 | 210 | 200 | 170 |
| Example 3-4 | 1.5 | Bare | 100 | 240 | 230 | 210 | 200 | 190 |
| Example 3-5 | 3.0 | Bare | 20 | 240 | 230 | 220 | 210 | 190 |

*Note: "Bare" means "unplated," and "Bronze" means "a bronze-plated."

EXAMPLE 4

One emulsion-type lubricants was prepared which comprised the following components:

(1) 3 parts by weight of ethylenediamine phosphate
(2) 8 parts by weight of triethanolamine oleate
(3) 4 parts by weight of laurylamine octaethyleneglycol
(4) 3 parts by weight of octadecane
(5) 2 parts by weight of tetraethylene glycol laurate
(6) 5 parts by weight of butanediol dodecylphosphate pentapropylene glycol
(7) 0.5 parts by weight of methyl p-hydroxybenzoate
(8) 1 part by weight of methylbenzotriazole
(9) 72.5 parts by weight of water
(10) 1 part by weight of 1,3,5-triazine-2,4,6-trithiol diethanolamine (FDE)

Further, for purpose of comparison, an emulsion-type lubricant was prepared which was identical to the emulsion-type lubricant whose composition is specified above, except that it contained no FDE.

The two lubricants, thus prepared, were diluted seven times. Each diluted lubricant was filled in the lubricant tank of wire-drawing apparatus illustrated in FIG. 1. Two bronze-plated wires (a plated amount: of 4.1 g per 1 kg of steel, Cu content in the plate: 65%) and having diameters of 1.60 mm and 1.00 mm, respectively, were drawn in the bath of each lubricant at rate of 800 m/min. Thereby two bronze-plated wires were obtained, one having a diameter of 0.38 mm, and the other having a diameter of 0.20 mm. Three wires having the diameter of 0.20 mm were twisted together, thus forming a core. Six wires having the diameter of 0.38 mm were twisted around the core, thus forming a sheath, whereby a steel cord was made. As a result, two types of steel cords were obtained.

Meanwhile, five different NR compounds were prepared which were identical in that they comprised the following components, but they were different in the content of sulfur. Sheets were made of each NR compound, which had a size of 1.5 mm × 12 mm × 10 cm.

(a) 100 parts by weight of natural rubber (NR)
(b) 50 parts by weight of carbon black (HAF)
(c) 5 parts by weight of process oil
(d) 1 to 8 parts by weight of sulfur (specified in Table 3)
(e) 0.8 parts by weight of N-cyclohexyl-2-benzothiazyl-sulfenamide (CBS)
(f) 10 parts by weight of zinc oxide
(g) 1 part by weight of N,N-dioctylphenylenediamine Ten pieces of steel cord of the first type were laid, side by side, on every sheet made of any NR compound, and then the rubber sheet was vulcanized at 153° C. for 30 minutes. As a result, five types of cord-rubber composite members were made. Both end portions of each cord-rubber composite member, either having a cord, were cut off. As a result of this, five groups of composite members, each member having eight cords, were obtained. These five groups of composite members will be referred to as "Examples 4-1" to "Example 4-5."

Similarly, ten pieces of steel cord of the second type were laid, side by side, on every sheet made of any NR compound, and then the rubber sheet was vulcanized at 153° C. for 30 minutes. As a result, five types of cord-rubber composite members were made. Both end portions of each cord-rubber composite member, either having a cord, were cut off. As a result of this, five groups of composite members, each member having eight cords, were obtained. These five groups of composite members will be referred to as "Comparative Examples 4-1" to "Comparative Example 4-5."

The cord-rubber composite members of Examples 4-1 to 4-5, and also those of Comparative Examples 4-1 to 4-5 were subjected to peeling-strength test carried out by an automatic tensile tester. More specifically, some of the composite members of Examples 4-1 to 4-5 were tested without being further treated; some other of the composite members were tested after immersed in hot water of 95° C. for five days, or water-deteriorated; and the remaining composite members were tested after heated in a test tube of 100° C. for three days, or heat-deteriorated. Thereafter, the rubber sheet was peeled from each cord-rubber composite member at 20° C. at the rate of 50 mm/min. The cord-rubber composite members of Comparative Examples 4-1 to 4-5 were tested in the same way. The results of the peeling-strength test were as is shown in Table 3.

As can be understood from Table 3, the cord-rubber composite members of Comparative Example 4-1 to 4-5(having cords made of steel wires drawn while passed through a bath of the lubricant containing no FDE) exhibited peeling strength increasing with the sulfur content of the rubber compound. As is evident from Table 3, too, Comparative Example 4-2 whose rubber member contained 2 parts by weight of sulfur and which was either water-deteriorated or heat-deteriorated exhibited maximum peeling strength, and Comparative Examples 4-3, 4-4, and 4-5 whose rubber members contained more sulfur exhibited less peeling strength. Hence, with regard to those cord-rubber composite members of Comparative Examples 4-1 to 4-5, no rubber composite having optimal composition exists which exhibits a sufficient peeling strength, both immediately after they had been made and after they had been water- or heat-deteriorated.

As can be understood from Table 3, also the cord-rubber composite members of Examples 4-1 to 4-5 (having cords made of steel wires drawn while passed through a bath of the lubricant containing FDE) exhibited peeling strength increasing with the sulfur content of the rubber compound, as those of Comparative Examples 4-1 to 4-5. In particular, the composite members, whose rubber members had a low sulfur content and without being further treated, exhibited great peeling strength; the composite members, whose rubber members had a high sulfur content and which were either water-deteriorated or heat-deteriorated, exhibited great peeling strength. Hence, Examples 4-1 to 4-5 includes cord-rubber composite members which had a sufficient peeling strength, both immediately after they had been made and after they had been water- or heat-deteriorated.

lubricant, at rate of 800 m/min. Thereby two bronze-plated wires were obtained, both having a diameter of 0.25 mm. Five wires were twisted together, thus forming a steel cord. As a result of this, two types of steel cords were obtained, which will be referred to as "Example 5-1" and "Comparative Example 5-1."

Both Example 5-1 and Comparative Example 5-1 were left to stand for three days in an atmosphere at temperature of 70° C. and humidity of 90%. Then, Example 5-1 and Comparative Example 5-1 were subjected to rapture test conducted in the Staircase method by means of a Hunter's fatigue-testing machine, thereby determining the rapture strengths of the steel wire cords. Example 5-1 had rapture strength of 107 kgf/mm$^2$, whereas Comparative Example 5-1 had rapture strength of 81 kgf/mm$^2$. This reveals that Example 5-1, i.e., the cord made of wires surface-treated with a lubricant containing a triazine-thiol derivative, was more corrosion-resistant than Comparative Example 5-1, i.e., the cord made of wires surface-treated with a lubricant containing no triazine-thiol derivatives.

TABLE 3

| | Triazine-Thiol Derivative | Sulfur Content in Rubber Compound (phr) | Peeling Strength (kN/m) | | |
|---|---|---|---|---|---|
| | | | Initial | WDed* | HDed* |
| Comparative Example 4-1 | — | 1.0 | 1.0 | 0 | 3.5 |
| Comparative Example 4-2 | — | 2.0 | 7.0 | 4.3 | 6.5 |
| Comparative Example 4-3 | — | 3.5 | 9.8 | 3.0 | 5.7 |
| Comparative Example 4-4 | — | 5.0 | 10.0 | 2.1 | 3.3 |
| Comparative Example 4-5 | — | 8.0 | 10.5 | 1.0 | 2.4 |
| Example 4-1 | FDE | 1.0 | 4.8 | 4.3 | 5.5 |
| Example 4-2 | FDE | 2.0 | 8.9 | 6.6 | 7.6 |
| Example 4-3 | FDE | 3.5 | 10.5 | 6.5 | 6.3 |
| Example 4-4 | FDE | 5.0 | 10.6 | 4.6 | 4.3 |
| Example 4-5 | FDE | 8.0 | 10.4 | 4.2 | 3.2 |

*Note: "WDed" stands for "water-deteriorated," and "HDed" stands for "heat-deteriorated."

EXAMPLE 5

One emulsion-type lubricant was prepared which comprised the following components:

(1) 3 parts by weight of ethylenediamine phosphate
(2) 8 parts by weight of triethanolamine oleate
(3) 4 parts by weight of laurylamine octaethyleneglycol
(4) 3 parts by weight of octadecane
(5) 2 parts by weight of butanediol linolenate tetraethylene glycol
(6) 5 parts by weight of butanediol dodecylphosphate pentapropylene glycol
(7) 0.5 parts by weight of methyl p-hydroxybenzoate
(8) 1 part by weight of methylbenzotriazole
(9) 72.5 parts by weight of water
(10) 1 part by weight of 6-dibutylamino-1,3,5-triazine-2,4-dithiol monoethylenediamine (DBME)

Further, for purpose of comparison, an emulsion-type lubricant was prepared, which was identical to the emulsion-type lubricant whose composition is specified above, except that it contained no triazine-thiol derivatives.

The two lubricants, thus prepared, were diluted seven times. Each diluted lubricants was filled in the lubricant tank of wire-drawing apparatus illustrated in FIG. 1. A bronze-plated wire (a plated amount: 4.1 g per 1 kg of steel, Cu content in the plate: 65%) having the diameter of 1.25 mm were drawn in the bath of each In the meantime, an NR-BR compound was prepared, the composition of which was as follows:

(a) 70 parts by weight of natural rubber (NR)
(b) 30 parts by weight of butadiene rubber (BR)
(c) 50 parts by weight of carbon black (HAF)
(d) 5 parts by weight of process oil
(e) 5 parts by weight of sulfur
(f) 0.8 parts by weight of N-cyclohexyl-2-benzothiazyl-sulfenamide (CBS)
(g) 10 parts by weight of zinc oxide
(h) 1 part by weight of N-(1,3-dimethylbuthyl)-N'-phenyl-p-phenylenediamine The cord of Example 5-1 was embedded in a mass of the NR-BR compound, followed by being set into a mold and vulcanized at 70° C. for 30 minutes. The vulcanized mass was removed from the mold, thereby forming cord-rubber composite member, having a diameter of 3 mm and a length of 1 m, which will be referred to as "Example 5-2." Similarly, the cord of Comparative Example 5-1 was embedded in a mass of the NR-BR compound, followed by being set into a mold and vulcanized at 70° C. for 30 minutes. The vulcanized mass was removed from the mold, thereby obtaining cord-rubber composite member, also having a diameter of 3 mm and a length of 1 m, which will be referred to as "Comparative Example 5-2." The composite members of Example 5-2 and Comparative Example 5-2 were left to stand for three days in an atmosphere at temperature of 70° C. and humidity of 90%. Then, Example 5-2 and Comparative Example 5-2 were subjected to rapture test conducted in the Staircase method by means of the Hunter's fatigue-testing machine, thereby determining the rapture strengths of Example 5-2 and Comparative Example 5-2. Example 5-2 had rapture strength of 103 kgf/mm$^2$, whereas Comparative Example 5-2 had rapture strength of 68 kgf/mm$^2$.

Generally, the cords in cord-rubber composite members are said to have their fatigue strength much reduced when the composite members are left to stand at high temperatures and high humidities. This may be proved true by the rapture strength of Comparative Example 5-2. By contrast, Example 5-2 can remain strong even if left to stand at high temperatures and high humidities.

EXAMPLES 6 to 9

Figure 7:
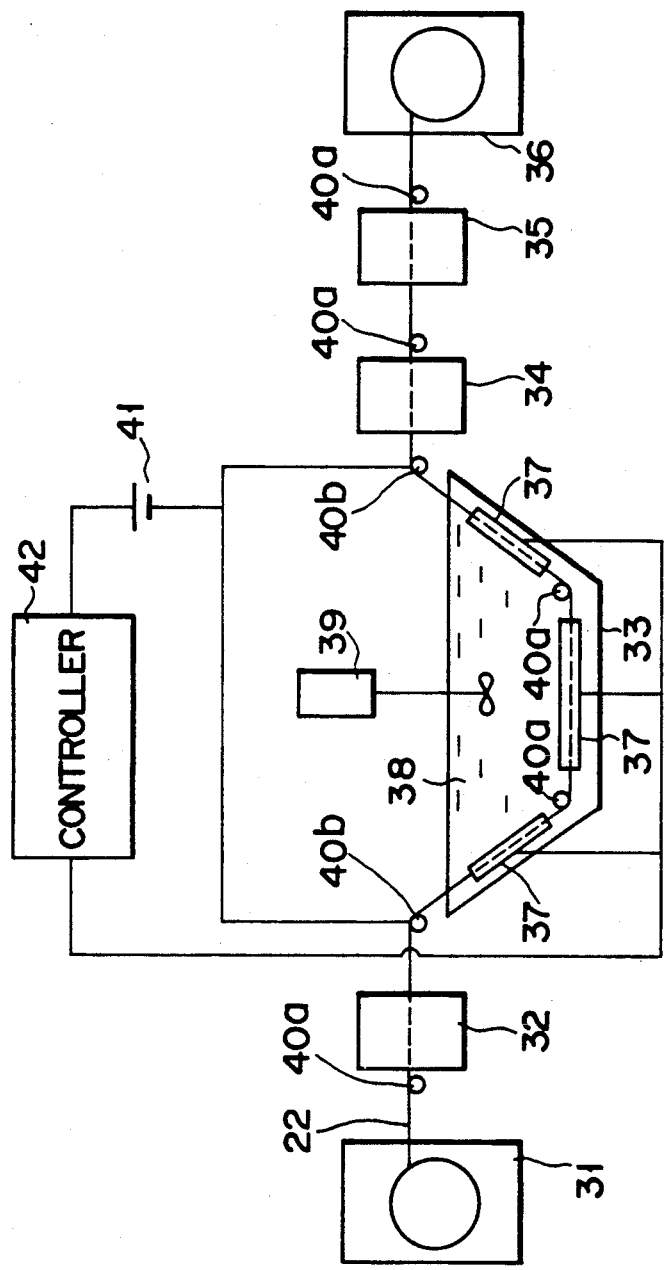
FIG. 7 is a diagram schematically illustrating the electrodeposition apparatus used in manufacturing a steel wire according to an example of the present invention.

FIG. 7 illustrates an electrodeposition apparatus used to manufacture Examples 6 to 9 of the present invention. As FIG. 7 shows, the electrodeposition apparatus comprises a wire supply device 31, a degreasing device 32, an electrodeposition tank 33, a washing device 34, a drying device 35, and a wire takeup device 36—all arranged sequentially. Three hollow cylindrical electrodes 37 made of platinum or carbon are located in the electrodeposition tank 33.

A wire-feeding roller 40a is located between the wire supply device 31 and the degreasing device 32, a wire-feeding roller 40b is provided between the device 32 and the tank 33, a wire-feeding roller 40b is arranged between the tank 33 and the washing device 34, a wire-feeding roller 40a is located between the washing device 34 and the drying device 35. Of these wire-feeding rollers, the two rollers 40b positioned at the upstream and downstream of the tank 33, respectively, are made of electrically conductive material. A steel wire 22 is supplied from the wire supply device 31, fed through the degreasing device 32, the electrodeposition tank 33, the washing device 34, and the drying device 34, and taken up by the wire takeup device 36, being guided by the rollers 40a and 40b all the way.

The electrodeposition tank 33 is filled with solution 38 of a triazine-thiol derivative. The solution 38 is stirred by a stirrer 39 while the electrodeposition apparatus is processing the wire 22. A power supply 41 and a current-voltage controller 42 are located out side the electrodeposition tank 33. The power supply 41 is connected to the rollers, and the controller 42 is connected to the power supply 41 and also to the electrodes 37, such that the hollow cylindrical electrodes 37 are positively charged and the rollers 40b and the steel wire 22 are negatively charged.

Both the wire supply device 31 and the wire takeup device 36 housed within electrically insulative boxes, which are connected to the ground while the electrodeposition apparatus is processing the wire 22. The wire supply device 31 may be replaced by a supply stand of the type commonly used in the art. The rollers 40a are coupled with electric motors (not shown), and can feed the steel wire 22 at the rate of 0.01 to 50 m/min. The rollers 40a and 40b are designed to rotate smoothly enough not to damage the surface of the wire 22. The rollers 40a are made of soft material such as rubber, whereas the rollers 40b are made of electrically conductive material such as metal or conductive rubber.

The electrodeposition tank 33 can be made of any material that is resistant to corrosion. Preferably, it is made of plastics or a metal plate having a plastics lining if the solution is an aqueous one, or made of a corrosion-resistant metal such as stainless steel if the solution is an organic one. It is desirable that the tank 33 be shaped like a bathtub. The size of the tank 33 is determined by the desired capacity of the electrodeposition apparatus.

The length and inside diameter of each hollow cylindrical electrode 37 are determined in accordance with the desired capacity of the electrodeposition apparatus. Generally, the smaller the inside diameter, the better, provided the length of each electrode 37 remain unchanged. This is because the current density and, hence, the electrodeposition speed is inversely proportional to the inside diameter of the hollow cylindrical electrode 37. However, if the inside diameter of the electrode is too small, there will be two undesired possibilities. First, the steel wire 22 may touch the inner periphery of the electrode 37, causing a short-circuit. Secondly, the triazine-thiol derivative may fail to diffuse sufficiently over the surface of the wire 22, inevitably reducing the efficiency of electrodeposition. In order to prevent these possibilities, through holes can be made in each hollow cylindrical electrode 37, or longitudinal grooves may be formed in the surface of each electrode 37. Further, each hollow cylindrical electrode 37 can be replaced by a plurality of shorter hollow cylindrical electrodes coaxially spaced apart from one another.

Figure 8:
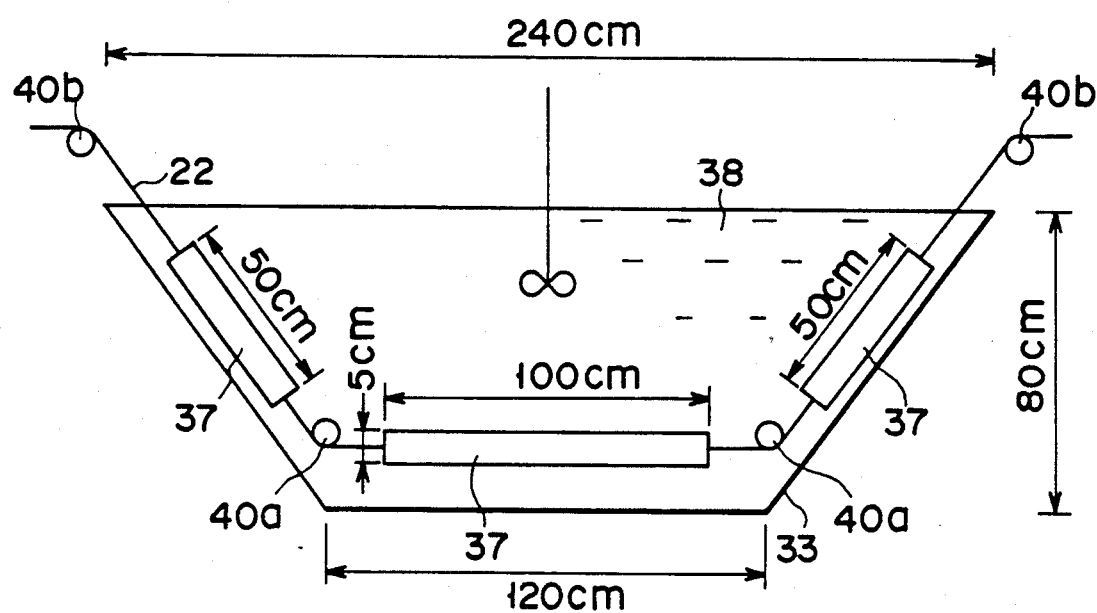
FIG. 8 is a diagram representing the sizes of the components of the electrodeposition apparatus shown in FIG. 7.

The sizes of the electrodeposition tank 33 and the hollow cylindrical electrodes 37 will be specified, with reference to FIG. 8. The electrodeposition tank 33 is shaped like a bathtub, having a trapezoidal cross section. The tank 33 is 130 cm long at the bottom, 240 cm long at the top, and 80 cm deep. The electrode 37 which extends along the bottom of the tank 33 has a length of 100 cm and an inside diameter of 5 cm. The remaining two electrodes 37, which extend along the front and rear inclined inner surfaces of the tank 33, respectively, have a length of 50 cm and an inside diameter of 5 cm.

The power supply 41 can be a battery or a rectifier connected to an AC power supply, which can output 0.1 mV to 20 V. The current-voltage controller 42 may be a constant current generator, a constant voltage generator, or a pulse generator. A constant current generator such as a galvanostat is used if the electrodeposition is performed at a constant current, and a constant voltage generator such as a potentiostat will be used if the electrodeposition is carried out at a constant voltage. It is advisable to use a pulse generator in combination with a galvanostat or a potentiostat in order to form a uniform coating of triazine-thiol derivative.

The degreasing device 32 located at the inlet of the electrodeposition tank 33 is designed to remove oil from the surface of the steel wire 22. More precisely, the device 33 sprays first trichloroethylene and then alcohol onto the steel wire 22, thereby removing oil from the wire 22 at high speed. In addition, the degreasing device 32 may perform a high-frequency washing on the wire 22, thereby to enhance the degreasing efficiency. After the wire 22 is made clear of oil, a uniform coating of triazine-thiol derivative can be formed on the surface of the steel wire 22.

The washing device 34 located at the outlet of the electrodeposition tank 33 is designed to wash the steel wire 22 which has been treated in the electrodeposition tank 33. To be more precise, it applies hot water under high pressure onto the steel wire 22 and then sprays a solution capable of substituting for water, such as methanol or acetone, onto the wire 22, so that the wire 22 may be more readily dried. The drying device 35 jets hot air, hot nitrogen gas, or hot argon gas onto the steel wire 22, thus drying the same.

EXAMPLE 6

A steel cord, hereinafter referred to as "cord A," was made which comprised a core consisting of three bronze-plated steel wires twisted together and having a diameter of 0.2 mm and a sheath consisting of six bronze-plated steel wires twisted around the core and having a diameter of 0.38 mm. The bronze layer plated on the wires consisted of 64.6% of copper and 35.4% of zinc, and had a thickness of 2300 Å.

A 1% aqueous solution of 1,3,5-triazine-2,4,6-trithiol monosodium (FN) was filled in the tank 33 of the electrodeposition apparatus shown in FIG. 7 and was maintained at 20° C. Four cords A, specified above, were supplied into the tank 33 and fed through the solution at the rates of 1 m/min, 3 m/min, 10 m/min, and 20 m/min, and thus surface-treated for 1 minute, 0.33 minutes, 0.1 minute, and 0.05 minutes, respectively, while a voltage of 0.3 V was being applied on the first three cords A, and a voltage of 1 V was being applied to the last cord A. Also, a 1% aqueous solution of 1,3,5-triazine-2,4,6-trithiol triethylamine (F.TEA) was filled in the tank 33 and maintained at 20° C., and two cords A were supplied into the tank 33 and fed at the rates of 3 m/min and 20 m/min, and thus surface-treated for 0.33 minutes and 0.05 minutes, while being applied with a voltage of 0.3 V and 1 V, respectively. As a result of this, six surface-treated cords A, hereinafter referred to as "Example 6-1" to "Example 6-6," were obtained.

For comparison purpose, a 1% aqueous solution of FN was filled in the tank 33 of the electrodeposition apparatus shown in FIG. 7 and was maintained at 20° C. Two cords A, specified above, were immersed in the FN solution for 3 minutes and 10 minutes, respectively. Further, a 1% aqueous solution of F.TEA was filled in the tank 33 and maintained at 20° C., and one cord A was immersed in the F.TEA for 10 minutes. As a result, three surface-treated cords A, hereinafter referred to as "Comparative Example 6-1" to "Comparative Example 6-3," were obtained.

The Examples 6-1 to 6-6 and Comparative Examples 6-1 to 6-3 were cut into one-meter pieces. These pieces of surface-treated cords were weighed by means of a scale which can measure a minimum of 0.005 mg. Then, the amount of the triazine-thiol derivative deposited on each one-meter piece was calculated from the weight of the one-meter piece. The results were as is shown in Table 4.

As is clearly seen from Table 4, Examples 6-1 to 6-6 had triazine-thiol derivative coatings more than those of Comparative Examples 6-1 to 6-3, despite that the time for electrically depositing treatment is much shorter than the time for immersing treatment. It follows that the wire is far less likely to be corroded while being subjected to the electrodeposition than while being immersed in the solution.

TABLE 4

|  | Triazine-Thiol Derivative | Voltage (V) | Speed (m/min) | Time (m/min) | Amount of Coating (mg/dm²) |
| --- | --- | --- | --- | --- | --- |
| Comparative Example 6-1 | FN | Immersion | | 3 | <0.1 |
| Comparative Example 6-2 | FN | Immersion | | 10 | 0.2 |
| Comparative Example 6-3 | F.TEA | Immersion | | 10 | 0.1 |
| Example 6-1 | FN | 0.3 | 1 | 1 | 0.5 |
| Example 6-2 | FN | 0.3 | 3 | 0.33 | 1.3 |
| Example 6-3 | FN | 0.3 | 10 | 0.1 | 1.9 |
| Example 6-4 | FN | 1 | 20 | 0.05 | 1.1 |
| Example 6-5 | F.TEA | 0.3 | 3 | 0.33 | 0.9 |
| Example 6-6 | F.TEA | 1 | 20 | 0.05 | 1.0 |

EXAMPLE 7

In order to determine the strength of adhesion between bronze-plated steel wires having a diameter of 0.38 mm, hereinafter referred to as "wires B," and a rubber compound later specified, the following experiment was conducted. As in Example 6, the bronze layer plated on the steel wires consisted of 64.6% of copper and 35.4% of zinc, and had a thickness of 2300 Å.

A 1% aqueous solution of 1,3,5-triazine-2,4,6-trithiol monosodium (FN) was filled in the tank 33 of the electrodeposition apparatus shown in FIG. 7 and was maintained at 20° C. Three wires B, specified above, were supplied into the tank 33 and fed through the solution at the rates of 1 m/min, 2 m/min, and 10 m/min, and thus surface-treated for 1 minute, 0.5 minutes, and 0.1 minute, respectively, while voltages 0.2 V, 0.5 V, and 10 V were being applied on the three cords A, respectively. As a result, three surface-treated steel wires B were obtained which will be referred to as "Example 7-1," "Example 7-2," and "Example 7-3."

Also, a 1% aqueous solution of 6-anilino-1,3,5-triazine-2,4-dithiol monosodium (AN) was filled in the tank 33 and maintained at 20° C., and one steel wire B was supplied into the tank 33 and fed at the rates of 3 m/min, and thus surface-treated for 0.33 minutes, while being applied with a voltage of 5 V, whereby a surface-treated steel wire B was obtained which will be referred to as "Example 7-4." Further, a 1% aqueous solution of 6-dibutylamino-1,3,5-triazine-2,4-dithiol monosodium (DBN) was filled in the tank 33 and maintained at 20° C., and one steel wire B was supplied into the tank 33 and fed at the rates of 3 m/min, and thus surface-treated for 0.33 minutes, while being applied with a voltage of 5 V, whereby a surface-treated steel wire B was obtained which will be referred to as "Example 7-5." Still further a 1% aqueous solution of 6-diallylamino-1,3,5-triazine-2,4-dithiol monosodium (DAN) was filled in the tank 33 and maintained at 20° C., and one steel wire B was supplied into the tank 33 and fed at the rates of 3 m/min, and thus surface-treated for 0.33 minutes, while being applied with a voltage of 5 V, whereby a surface-treated steel wire B was obtained which will be referred to as "Example 7-6."

For comparison purpose, a wire B not surface-treated at all was used as Comparative Example 7-1. Further, for the same purpose, a 1% aqueous solution of FN was filled in the tank 33 of the electrodeposition apparatus shown in FIG. 7 and was maintained at 20° C., and a wire B was immersed in the FN solution for 0.5 minutes, thus obtaining a surface-treated wire, which will be referred to as "Comparative Example 7-2." Moreover, a 1% aqueous solution of FN was filled in the tank 33 and maintained at 70° C., and a wire B was immersed in the T.TEA for 30 minutes, thereby obtaining a surface-treated steel wire, which will be referred to as "Comparative Example 7-3."

The Examples 7-1 to 7-6 and Comparative Examples 7-1 to 7-3, i.e., nine types of surface-treated steel wires, were cut into pieces 10 cm long. Both end portions of each wire piece, thus obtained, were coated with epoxy resin which sets at room temperature. All pieces of surface-treated wires were left to stand for three days in an atmosphere at temperature of 70° C. and humidity of 90%.

Meanwhile, an NR-BR compound was prepared, the composition of which was as follows:

(a) 100 parts by weight of natural rubber (NR)
(b) 50 parts by weight of carbon black (HAF)
(c) 5 parts by weight of sulfur
(d) 0.8 parts by weight of N-cyclohexyl-2-benzothiazyl-sulfenamide (CBS)
(e) 10 parts by weight of zinc oxide Each steel wire piece, which had been left to stand at temperature of 70° C. and humidity of 90% for three days, was embedded its one end in mass of the NR compound specified above. Each NR compound mass containing each piece of wire was heated at 140° C. for 30 minutes, thus producing wire-rubber composite member. Each wire-rubber composite member was subjected to pull-out test carried out by an automatic tensile tester (i.e., Autograph p-100 manufactured by K.K. Shimazu). More precisely, the wire was pulled out of the rubber member at the rate of 50 mm/min, thus measuring the pull-out strength of each composite member. From this pull-out strength, the wire-rubber adhesive property of each composite member was evaluated. Further, the ratio of the cord surface area covered with the rubber was measured. The results were as is shown in Table 5.

Comparative Example 7-1, i.e., a bronze-plated steel wire not surface-treated, rusted and did not adhered firmly to the NB compound. Hence, its pull-out strength was 5 kg/cm only as is shown in Table 5.

The coating of Comparative Example 7-2 was not sufficiently much since this steel wire had been made by immersing a wire in the FN solution for a short time, i.e., 0.5 minutes only. Thus, Comparative Example 7-2 was not adequately resistant to corrosion, and its drawing strength was no more than 10 kg/cm. Although Comparative Example 7-3 had a thick coating since it had been made by immersing a wire for a relatively long time, i.e., 30 minutes, it did not firmly adhere to the NR compound. This is because the steel wire rusted whilst the coating was formed on the steel wire. It may be economical and not harmful to immerse a steel wire in an aqueous solution of a triazine-thiol derivative, but this process does seem improper as a method of forming a protective coating on a steel wire. This is why steel wires are generally immersed in an organic solution of a triazine-thiol derivative in order to produce steel wires which are sufficiently resistant to corrosion.

By contrast, as is evident from Table 5, Examples 7-1 to 7-6 adhered firmly to the NR compound. This is because they were made by subjecting steel wires to electrodeposition for a relatively short time, while feeding the wires through an aqueous solution of a triazine-thiol derivative, thus forming dense, corrosion-resistant coatings on the steel wires.

TABLE 5

| | Triazine-Thiol Derivative | Temp. (°C.) | Voltage (V) | Speed (m/min) | Time (min) | Pull-out Strength (kg/cm) | RCA* (%) |
|---|---|---|---|---|---|---|---|
| Comparative Example 7-1 | — | — | — | — | — | 5 | 0 |
| Comparative Example 7-2 | FN | 20 | Immersion | | 0.5 | 10 | 20 |
| Comparative Example 7-3 | FN | 70 | Immersion | | 30 | 10 | 20 |
| Example 7-1 | FN | 20 | 0.2 | 1 | 1 | 30 | 45 |
| Example 7-2 | FN | 20 | 0.5 | 2 | 0.5 | 40 | 85 |
| Example 7-3 | FN | 20 | 10 | 10 | 0.1 | 30 | 60 |
| Example 7-4 | AN | 20 | 5 | 3 | 0.33 | 45 | 75 |
| Example 7-5 | DBN | 20 | 5 | 3 | 0.33 | 35 | 60 |
| Example 7-6 | DAN | 20 | 5 | 3 | 0.33 | 65 | 100 |

*Note: "RCA" stands for "rubber-covered area."

EXAMPLE 8

The following experiment was conducted in order to determine how the sulfur content of a rubber composition influences the adhesion strength between cord A specified above and the rubber compound.

A 1% aqueous solution of 1,3,5-triazine-2,4-trithiol monosodium (FN) was filled in the tank 33 of the electrodeposition apparatus shown in FIG. 7 and was maintained at 20° C. Cords A were supplied into the tank 33 and fed at the rate of 3 m/min, while applying a constant voltage of 0.3 V on the cords A by means of a potentiostat. Also, other cords A were supplied into the tank 33 and fed at the rate of 3 m/min, while supplying a constant current of 10 mA by means of a galvanostat. As a result, surface-treated cords of two types were prepared.

For comparison, cords A not surface-treated at all were prepared, and cords A were immersed in the 1% aqueous solution of FN.

In the meantime, five NR compounds were prepared which were identical in composition, except for the content of sulfur. They comprised 100 parts by weight of natural rubber (NR), 50 parts by weight of carbon black (HAF), 10 parts by weight of zinc oxide, 0.8 parts by weight of CBS (i.e., vulcanization accelerator), and sulfur used in an amount ranging from 1 to 10 parts by weight as is shown in Table 7. More precisely, the first NR compound was prepared by mixing natural rubber, carbon black, and zinc oxide were mixed by a Banbury mixer, thus forming a mixture, and then adding 0.8 parts by weight of CBS and 1 part by weight of sulfur were added to this mixture. The other four NR compounds were obtained in the same way, except that sulfur was added to the mixture in different amounts, i.e., 2 parts by weight, 3.5 parts by weight, 5 parts by weight, and 10 parts by weight, respectively, as is specified in Table 6. Each of the five NR compounds, thus prepared, was processed into sheets having a size of 10 cm×1.5 cm×1.5 mm. Hence, sheets having the same size, but made of five different NR compounds, were obtained.

The cords A not surface-treated at all were cut into pieces 10 cm long. Every 12 cord pieces were sandwiched between two sheets made of each of the five different NR compounds, thus forming a cord-rubber composite unit. Both end portions of this composite unit, either 2 cm long, were wrapped with aluminum foil, and the composite unit was pressed at 140° C. for 30 minutes, with a pressure of 10 kg/cm$^2$, thereby obtaining a cord-rubber composite member. As a result of this, five cord-rubber composite members were made, which will be referred to as "Comparative Example 8-1" to "Comparative Example 8-5."

The cords A, which had been immersed in the 1% aqueous solution of FN, were cut into pieces 10 cm long. Every 12 cord pieces were sandwiched between two sheets made of each of the five different NR compounds, thus forming a cord-rubber composite unit. The composite unit was processed and pressed in the same way as in producing Comparative Examples 8-1 to 8-5, thereby obtaining a cord-rubber composite member. As a result of this, five cord-rubber composite members were made, which will be referred to as "Comparative Example 8-6" to "Comparative Example 8-10."

Also, the cords A, which had been been subjected to electrodeposition, while applied with the constant voltage, were cut into pieces 10 cm long. Every 12 cord pieces were sandwiched between two sheets made of each of the five different NR compounds, thus forming a cord-rubber composite unit. The composite unit was processed and pressed in the same way as in producing Comparative Examples 8-1 to 8-5, thereby obtaining a cord-rubber composite member. As a result of this, five cord-rubber composite members were made, which will be referred to as "Example 8-1" to "Example 8-1."

Further, the cords A, which had been been subjected to electrodeposition, while applied with the constant current, were cut into pieces 10 cm long. Every 12 cord pieces were sandwiched between two sheets made of each of the five different NR compounds, thus forming a cord-rubber composite unit. The composite unit was processed and pressed in the same way as in producing Comparative Examples 8-1 to 8-5, thereby obtaining a cord-rubber composite member. As a result of this, five cord-rubber composite members were made, which will be referred to as "Example 8-6" to "Example 8-10."

A notch having a width of 1 cm was cut in each of Examples 8-1 to 8-10 and Comparative Examples 8-1 to 8-10. Then, these twenty cord-rubber composite members were subjected to peeling-strength test carried out by an automatic tensile tester. More specifically, one rubber sheet was peeled from each cord-rubber composite member at the rate of 50 mm/min, and the peeling strength of the composite member was measured. Further, twenty cord-rubber composite members, which were identical to Examples 8-1 to 8-10 and Comparative Examples 8-1 to 8-10, were prepared and then kept immersed in hot water at 95° C. for three days, and further left to stand in air at 20° C. for one day. Peeling-strength test was performed on the cord-rubber composite members, thus water-deteriorated, in the same way, and peeling strength of these composite members were measured. The results of the peeling-strength test were as is shown in Table 6.

As can be understood from Table 6, the peeling strength of each cord-rubber composite member is proportional to the sulfur content of the NB compound used, whether the cords had been surface-treated or not. Of the comparative examples, which had been water-deteriorated, rubber sheets contained 2 parts by weight of sulfur exhibited the greatest peeling strengths. Of the examples, which had been water-deteriorated, rubber sheets contained 3.5 parts by weight of sulfur exhibited the greatest peeling strengths. Also, as is evident from Table 6, of Examples 8-1 to 8-10 which had cords subjected to electrodeposition, those which had not been water-deteriorated and whose rubber sheets contained a relatively low sulfur content exhibited a relatively great peeling strength, and those which had been water-deteriorated exhibited a great peeling strength, regardless of the sulfur content of their rubber sheets. In particular, those of Examples 8-1 to 8-10, which had been water-deteriorated and whose rubber sheets had a high sulfur content, exhibited a peeling strength far greater than those of Comparative Examples 8-1 to 8-10 which had been water-deteriorated and whose rubber sheets had a high sulfur content.

The steel cords hitherto used for reinforcing automobile tires are those prepared by immersing steel cords in a surface-treating solution. These steel cords are embedded in members of rubber compounds having high sulfur contents, in order to increase the peeling strength which the tires may exhibits right after they have been manufactured, inevitably decreasing the cord-rubber adhesion as the tires gradually water-deteriorated. By contrast, the steel cord according to the invention, which has been subjected to electrodeposition, is rarely influenced by the sulfur content of the rubber member in which it is embedded. Hence, the steel cord of the invention serves to manufacture cord-rubber composite members which have a sufficient peeling strength, either immediately after they are made or after they are water-deteriorated. As is evident also from Table 6, it is recommendable to supply a constant current, rather than to apply a constant voltage, to the steel cords, in order to treating the surface of the steel cords.

TABLE 6

| | Triazine-Thiol Derivative | Surface Treatment | Sulfur Content in Rubber Compound (phr) | Peeling Strength (kN/cm) | |
|---|---|---|---|---|---|
| | | | | Initial | WDed* |
| Comparative | — | Not Treated | 1 | 0.8 | 0.7 |

TABLE 6-continued

| | Triazine-Thiol Derivative | Surface Treatment | Sulfur Content in Rubber Compound (phr) | Peeling Strength (kN/cm) Initial | WDed* |
| --- | --- | --- | --- | --- | --- |
| Comparative Example 8-1 | — | Not Treated | 2 | 8.5 | 5.5 |
| Comparative Example 8-2 | — | Not Treated | 3.5 | 9.8 | 2.1 |
| Comparative Example 8-3 | — | Not Treated | 5 | 10.5 | 1.0 |
| Comparative Example 8-4 | — | Not Treated | 10 | 11.0 | 0.5 |
| Comparative Example 8-5 | FN | Immersion | 1 | 2.1 | 1.1 |
| Comparative Example 8-6 | FN | Immersion | 2 | 9.5 | 6.5 |
| Comparative Example 8-7 | FN | Immersion | 3.5 | 9.9 | 3.8 |
| Comparative Example 8-8 | FN | Immersion | 5 | 10.1 | 3.3 |
| Comparative Example 8-9 | FN | Immersion | 10 | 10.0 | 2.1 |
| Example 8-1 | FN | Constant Voltage Applied | 1 | 3.2 | 2.5 |
| Example 8-2 | FN | Constant Voltage Applied | 2 | 9.9 | 6.5 |
| Example 8-3 | FN | Constant Voltage Applied | 3.5 | 10.5 | 7.6 |
| Example 8-4 | FN | Constant Voltage Applied | 5 | 10.5 | 5.5 |
| Example 8-5 | FN | Constant Voltage Applied | 10 | 10.0 | 3.4 |
| Example 8-6 | FN | Constant Current Applied | 1 | 4.5 | 3.5 |
| Example 8-7 | FN | Constant Current Applied | 2 | 10.5 | 7.0 |
| Example 8-8 | FN | Constant Current Applied | 3.5 | 10.4 | 7.8 |
| Example 8-9 | FN | Constant Current Applied | 5 | 10.7 | 6.5 |
| Example 8-10 | FN | Constant Current Applied | 10 | 10.4 | 3.8 |

*Note: "WDed" stands for "water-deteriorated."

EXAMPLE 9

The following experiment was conducted, thereby to determine how the type of vulcanizer in a rubber compound influences the adhesion strength between cord A specified above and the rubber compound.

A 1% aqueous solution of 1,3,5-triazine-2,4-trithiol monosodium (FN) was filled in the tank 33 of the electrodeposition apparatus shown in FIG. 7 and was maintained at 20° C. Cords A were supplied into the tank 33 and fed at the rate of 3 m/min, while supplying a constant current of 10 mA by means of a galvanostat. Further, other cords A were supplied into the tank 33 and fed at the rate of 3 m/min, while applying a constant voltage of 0.3 V on the cords A by means of a potentiostat. As a result, surface-treated cords of two types were prepared.

For comparison, cords A were immersed in the 1% aqueous solution of FA.

Meanwhile, four rubber compounds were prepared. The first rubber compound comprised 100 parts by weight of butadiene rubber (BR), 0.5 parts by weight of tetrabutylthiuramdifulfide (TT, vulcanization accelerator), 4 parts by weight of sulfur, 5 parts by weight of zinc oxide, and 1 part by weight of isopropylphenylenediamine (IPPD). The second rubber compound comprised 100 parts by weight of styrene-butadiene rubber (SBR), 5 parts by weight of α,α'-bis(t-butylperoxy)isopropylbenzene (PKD), and 1 part by weight of IPPD. The third rubber compound comprised 100 parts by weight of acrylonitrile-butadiene rubber (NBR), 6 parts by weight of PDK, and 1 part by weight of IPPD. The fourth rubber compound comprised 100 parts by weight of ethylene-propylene-dienemethylene rubber (EPDM), 8 parts by weight of PKD, and 1 part by weight of IPPD.

Each of the four rubber compounds, thus prepared, was processed into sheets having a size of 10 cm × 1.5 cm × 1.5 mm. Hence, sheets having the same size, but made of four different rubber compounds, were obtained.

The cords A, which had been immersed in the FA solution, were cut into pieces 10 cm long. Every 12 cord pieces were sandwiched between two sheets made of each of the four different rubber compounds, thus forming a cord-rubber composite unit. The composite unit was pressed, thereby obtaining a cord-rubber composite member. As a result of this, four cord-rubber composite members were made, which will be referred to as "Comparative Example 9-1" to "Comparative Example 9-4."

Cords A, which had been subjected electrodeposition while being supplied with a constant current, were cut into pieces of 10 cm long. Twelve cord pieces were sandwiched between two sheets made of the first rubber compound, and other twelve cord pieces were sandwiched between two sheets of the second rubber compound. As a result, two cord-rubber units were made. These units were hot-pressed, thereby obtaining two cord-rubber composite members, which will be referred to as "Example 9-1" and "Example 9-2." Other cords A, which had been subjected electrodeposition while being applied with a constant voltage, were cut into pieces of 10 cm long. Twelve cord pieces were sandwiched between two sheets made of the third rubber compound, and other twelve cord pieces were sandwiched between two sheets of the fourth rubber compound. As a result, two cord-rubber units were made. These units were hot-pressed, thereby obtaining two cord-rubber composite members, which will be referred to as "Example 9-3" and "Example 9-4."

rubber compounds which contained either sulfur or peroxide used as vulcanizer. Examples 9-1 to 9-4 exhibited great peeling strength, immediately after they had been made, water-deteriorated, and heat-deteriorated.

Additional advantages and modifications will readily occur to those skilled in the art. Therefore, the invention in its broader aspects is not limited to the specific details, and illustrated examples shown and described. Accordingly, various modifications may be made without departing from the spirit or scope of the general inventive concept as defined by the appended claims and their equivalents.

TABLE 7

| | Triazine-Thiol Derivative | Surface Treatment | Rubber Compound (Parts by Weight) | | | | | | Peeling Strength (kN/cm) | | |
|---|---|---|---|---|---|---|---|---|---|---|---|
| | | | Rubber | PKD | TT | S | ZnO | IPPD | Initial | WDed* | HDed* |
| Comparative Example 9-1 | FN | Constant Voltage Applied | BR 100 | — | 0.5 | 4 | 5 | 1 | 3.6 | 0 | 2.2 |
| Comparative Example 9-2 | FN | Constant Voltage Applied | SBR 100 | 5 | — | — | — | 1 | 4.2 | 2.8 | 3.4 |
| Comparative Example 9-3 | FN | Constant Voltage Applied | NBR 100 | 6 | — | — | — | 1 | 5.4 | 3.5 | 4.8 |
| Comparative Example 9-4 | FN | Constant Voltage Applied | EPDM 100 | 8 | — | — | — | 1 | 4.3 | 4.1 | 4.2 |
| Example 9-1 | FN | Constant Current Applied | BR 100 | — | 0.5 | 4 | 5 | 1 | 6.8 | 5.6 | 5.5 |
| Example 9-2 | FN | Constant Current Applied | SBR 100 | 5 | — | — | — | 1 | 7.5 | 6.9 | 6.6 |
| Example 9-3 | FN | Constant Current Applied | NBR 100 | 6 | — | — | — | 1 | 8.2 | 7.7 | 7.6 |
| Example 9-4 | FN | Constant Current Applied | EPDM 100 | 8 | — | — | — | 1 | 5.6 | 6.7 | 7.2 |

*Note: "WDed" stands for "water-deteriorated," and "HDed" stands for "heat-deteriorated."

A notch having a width of 1 cm was cut in each of Examples 9-1 to 9-4 and Comparative Examples 9-1 to 9-4. Then, these eight cord-rubber composite members were subjected to peeling-strength test carried out by an automatic tensile tester. More specifically, one rubber sheet was peeled from each cord-rubber composite member at the rate of 50 mm/min, and the peeling strength of the composite member was measured. Further, eight cord-rubber composite members, which were identical to Examples 9-1 to 9-4 and Comparative Examples 9-1 to 9-4, were prepared and then kept immersed in hot water at 95° C. for three days, and further left to stand in air at 20° C. for one day. Peeling-strength test was performed on the cord-rubber composite members, thus water-deteriorated, in the same way, and peeling strength of these composite members were measured. Further, other eight cord-rubber composite members, which were identical to Examples 9-1 to 9-4 and Comparative Examples 9-1 to 9-4, were prepared and left to stand at 100° C. in an oven for three days, thus heat-deteriorated. Peeling-strength test was performed on the cord-rubber composite members, thus heat-deteriorated, in the same way, and peeling strength of these composite members were measured. The results of the peeling-strength test were as is shown in Table 7.

Although not shown in Table 7, the steel cords, which had not been surface-treated with a solution of triazine-thiol derivative, did not adhered to the rubber compound containing peroxide used as vulcanizer. However, as is evident from Table 7, the cords of Comparative Examples 9-1 to 9-4, which had been immersed in a solution of triazine-thiol derivative, adhered well to the rubber compounds. Further, the cords of Examples 9-1 to 9-4, which had been subjected to electrode-position while passing through a bath of a solution of triazine-thiol derivative, adhered very firmly to the four

What is claimed is:

1. A method of manufacturing a rubber-reinforcing steel wire, comprising
   contacting the wire with a triazine-thiol derivative represented by the following general formula:

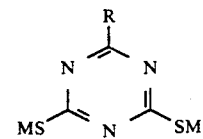

where R is —OR', —SR', —NHR', or —N(R')$_2$; R' is H, alkyl group, alkenyl group, phenyl group, phenylalkyl group, alkylphenyl group, or a cycloalkyl group, and M is H, Na, Li, K, ½Mg, ½Ba, ½Ca, primary, secondary or tertiary aliphatic amine, quaternary ammonium salt, or phosphonium salt, to adsorb the traizine-thiol derivative into the wire; and thereafter
   drawing the wire through a die in a bath of a lubricant containing 0.001 to 20% by weight of the triazine-thiol derivative, to form a polymer of the triazine-thiol derivative and thereby provide for better adhesion between the wire and rubber.

2. The method according to claim 1, wherein said lubricant is an emulsion comprising the triazine-thiol derivative, an extreme pressure lubricant, an oiliness improver, an emulsifier, and a defoaming agent all dispersed in a solvent.

3. The method according to claim 1, wherein said lubricant contains 0.01 to 5% by weight of the triazine-thiol derivative.

4. The method according to claim 1, wherein said steel wire is drawn at rate of at least 1 m/min.

5. A method of manufacturing rubber-reinforcing steel wire, comprising the steps of:
   immersing a steel wire and an electrode in a solution containing 0.001 to 10% by weight triazine-thiol derivative such that said electrode opposes said wire; and
   applying a voltage between the steel wire and the electrode,
   wherein said triazine-thiol derivative is one represented by the following general formula:

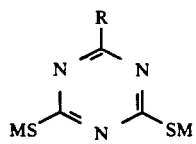

where R is—OR', —SR', —NHR', or —N(R')$_2$; R' is H, alkyl group, alkenyl group, phenyl group, phenylalkyl group, alkylphenyl group, or a cycloalkyl group, and M is H, Na, Li, K, $\frac{1}{2}$Mg, $\frac{1}{2}$Ba, $\frac{1}{2}$Ca, primary, secondary or tertiary aliphatic amine, quaternary ammonium salt, or phosphonium salt.

6. The method according to claim 5, wherein said steel wire is plated with bronze.

7. The method according to claim 5, wherein the solution of the triazine-thiol derivative is an aqueous solution.

8. The method according to claim 5, wherein the content of the triazine-thiol derivative in said solution is 0.05 to 2% by weight.

9. The method according to claim 5, wherein the voltage applied between the steel wire and the electrode is 100 V at most.

10. The method according to claim 9, wherein the voltage applied between the steel wire and the electrode is 0.1 to 20 V.

11. The method according to claim 5, wherein said electrode is shaped like a hollow cylinder, and the steel wire is guided through the electrode.

12. The method according to claim 5, wherein the voltage applied between the steel wire and the electrode is 0.1 to 100 V and the solution of the triazine-thiol derivative is an aqueous solution.

13. The method according to claim 12, wherein the voltage applied between the steel wire and the electrode is 0.1 to 20 V.

14. The method of claim 12, wherein the triazine-thiol derivative is selected from the group consisting of:
1,3,5-triazine, 2,4,6-trithiol, 1,3,5-triazine-2,4,6-trithiol monosodium, 1,3,5-triazine-2,4,6-trithiol monopotassium, 1,3,5-triazine-2,4,6-trithiol monoethanolamine, 1,3,5-triazine-2,4,6-trithiol diethanolamine, 1,3,5-triazine-2,4,6-trithiol triethylamine, 1,3,5-triazine-2,4,6-trithiol octylamine, 1,3,5-triazine-2,4,6-trithiol tetrabutylammonium, 1,3,5-triazine-2,4,6-trithiol bis(tetrabutylammonium), 6-anilino-1,3,5-triazine-2,4-dithiol, 6-anilino-1,3,5-triazine-2,4-dithiol monosodium, 6-anilino-1,3,5-triazine-2,4-dithiol triethylamine, 6-dibutylamino-1,3,5-triazine-2,4-dithiol, 6-dibutylamino-1,3,5-triazine-2,4-dithiol monosodium, 6-dibutylamino-1,3,5-triazine-2,4-dithiol monoethanolamine, 6-dibutylamino-1,3,5-triazine-2,4-dithiol ethylamine, 6-dibutylamino-1,3,5-triazine-2,4-dithiol triethylamine, 6-dibutylamino-1,3,5-triazine-2,4-dithiol butylamine, 6-dibutylamino-1,3,5-triazine-2,4-dithiol tetrabutylammonium, 6-dibutylamino-1,3,5-triazine-2,4-dithiol tetrabutylphosphonium, 6-diallylamino-1,3,5-triazine-2,4-dithiol, 6-diallylamino-1,3,5-triazine-2,4-dithiol monosodium, 6-diallylamino-1,3,5-triazine-2,4-dithiol monoethanolamine, 6-diallylamino-1,3,5-triazine-2,4-dithiol butylamine, 6-diallylamino-1,3,5-triazine-2,4-dithiol ethylenediamine, 6-diallyl amino-1,3,5-traizine-2,4-dithiol ethylenetriamine, 6-octylamino-1,3,5-triazine-2,4-dithiol, 6-octylamino-1,3,5-triazine-2,4-dithiolmonosodium.

15. The method of claim 5, wherein the traizine-thiol derivative is selected from the group consisting of:
1,3,5-traizine-2,4,6-trithiol, 1,3,5-triazine-2,4,6-trithiol monosodium, 1,3,5-triazine-2,4,6-trithiol monopotassium, 1,3,5-triazine-2,4,6-trithiol monoethanolamine, 1,3,5-triazine-2,4,6-trithiol diethanolamine, 1,3,5-triazine-2,4,6-trithiol triethylamine, 1,3,5-triazine-2,4,6-trithiol octylamine, 1.3.5-triazine-2,4,6-trithiol tetrabutylammonium, 1,3,5-triazine-2,4,6-trithiol bis(tetrabutylammonium), 6-anilino-1,3,5-triazine-2,4-dithiol, 6-anilino-1,3,5triazine-2,4-dithiol monosodium, 6-anilino-1,3,5-triazine-2,4-dithiol triethylamine, 6-dibutylamino-1,3,5-triazine-2,4-dithiol, 6-dibutylamino-1,3,5-triazine-2,4-dithiol monosodium, 6-dibutylamino-1,3,5-triazine-2,4-dithiol monoethanolamine, 6-dibutylamino-1,3,5-triazine-2,4-dithiol ethylamine, 6-dibutylamino-1,3,5-triazine-2,4-dithiol triethylamine, 6-dibutylamino-1,3,5-triazine-2,4-dithiol butylamine, 6-dibutylamino-1,3,5-triazine-2,4-dithiol tetrabutylammonium, 6-dibutylamino-1,3,5-triazine-2,4-dithiol tetrabutylphosphonium, 6-diallylamino-1,3,5-triazine-2,4-dithiol, 6-diallylamino-1,3,5-triazine-2,4-dithiol monosodium, 6-diallylamino-1,3,5-triazine-2,4-dithiol monoethanolamine, 6-diallylamino-1,3,5-triazine-2,4-dithiol butylamine, 6-diallylamino-1,3,5-triazine-2,4-dithiol ethylenediamine, 6-diallyl amino-1,3,5-triazine-2,4-dithiol ethylenetriamine, 6-octylamino-1,3,5-triazine-2,4-dithiol, 6-octylamino-1,3,5-triazine-2,4-dithiolmonosodium.

16. The method of claim 15, wherein the bath contains a solvent selected from the group consisting of neutral or alkaline water, glycol, polyethylene glycol, or diglyme, and the lubricant is ethylenediamine phosphate, ethylenetriamine phosphate, pentaethylenetetramine phosphate, proplylenediamine phosphate, butylenediamine phosphate, butylamine phosphate, octylamine phosphate, oleylamine phosphate, fatty acid ester-ethyleneoxide adduct, methylphosphate-propyleneoxide adduct, butylphosphate-propyleneoxide adduct, octylphosphate-propyleneoxide adduct, oleylephosphate-propyleneoxide adduct.

17. The method according to claim 5, wherein said solution is prepared by dissolving the triazine-thiol derivative in an electrically conductive solvent.

18. The method according to claim 5, wherein the current flowing between said wire and said electrode falls within a range of between 1 mA and 10 A.

19. The method according to claim 5, wherein the current flowing between said wire and said electrode falls within a range of between 5 mA and 100 mA.

20. The method according to claim 5, wherein voltage is kept applied between said wire and said electrode for 0.1 second to 10 minutes.

* * * * *

UNITED STATES PATENT AND TRADEMARK OFFICE
CERTIFICATE OF CORRECTION

PATENT NO. : 5,173,341

DATED : December 22, 1992

INVENTOR(S) : Nobuyoshi SHIRATORI et al

It is certified that error appears in the above-identified patent and that said Letters Patent is hereby corrected as shown below:

Title page, delete

"Section [30] Foreign Application Priority Data

Feb. 10, 1989 [JP] Japan ............ 1-31353
Feb. 10  1989 [JP] Japan ............ 1-31354"

Signed and Sealed this

Thirtieth Day of August, 1994

Attest:

BRUCE LEHMAN

Attesting Officer

Commissioner of Patents and Trademarks